Sept. 26, 1950 I. MOLNAR 2,523,914

RADIOTELEPHONE SYSTEM

Filed May 9, 1947 6 Sheets-Sheet 1

INVENTOR.
Imre Molnar

BY Smith, Olsen & Baird

Attorneys

Sept. 26, 1950 I. MOLNAR 2,523,914

RADIOTELEPHONE SYSTEM

Filed May 9, 1947 6 Sheets-Sheet 2

INVENTOR.
Imre Molnar

BY
Smith, Olsen & Baird
Attorneys

INVENTOR.
Imre Molnar

BY
Smith, Olsen & Baird
Attorneys

INVENTOR.
Imre Molnar
BY
Smith, Olsen & Baird
Attorneys

INVENTOR.
Imre Molnar
BY
Smith, Olsen & Baird
Attorneys

INVENTOR.
Imre Molnar
BY
Smith, Olsen & Baird
Attorneys

Patented Sept. 26, 1950 2,523,914

UNITED STATES PATENT OFFICE 2,523,914

RADIOTELEPHONE SYSTEM

Imre Molnar, Chicago, Ill., assignor to Automatic Electric Laboratories, Inc., Chicago, Ill., a corporation of Delaware Application May 9, 1947, Serial No. 746,929

8 Claims. (Cl. 250—6)

Figure 1:
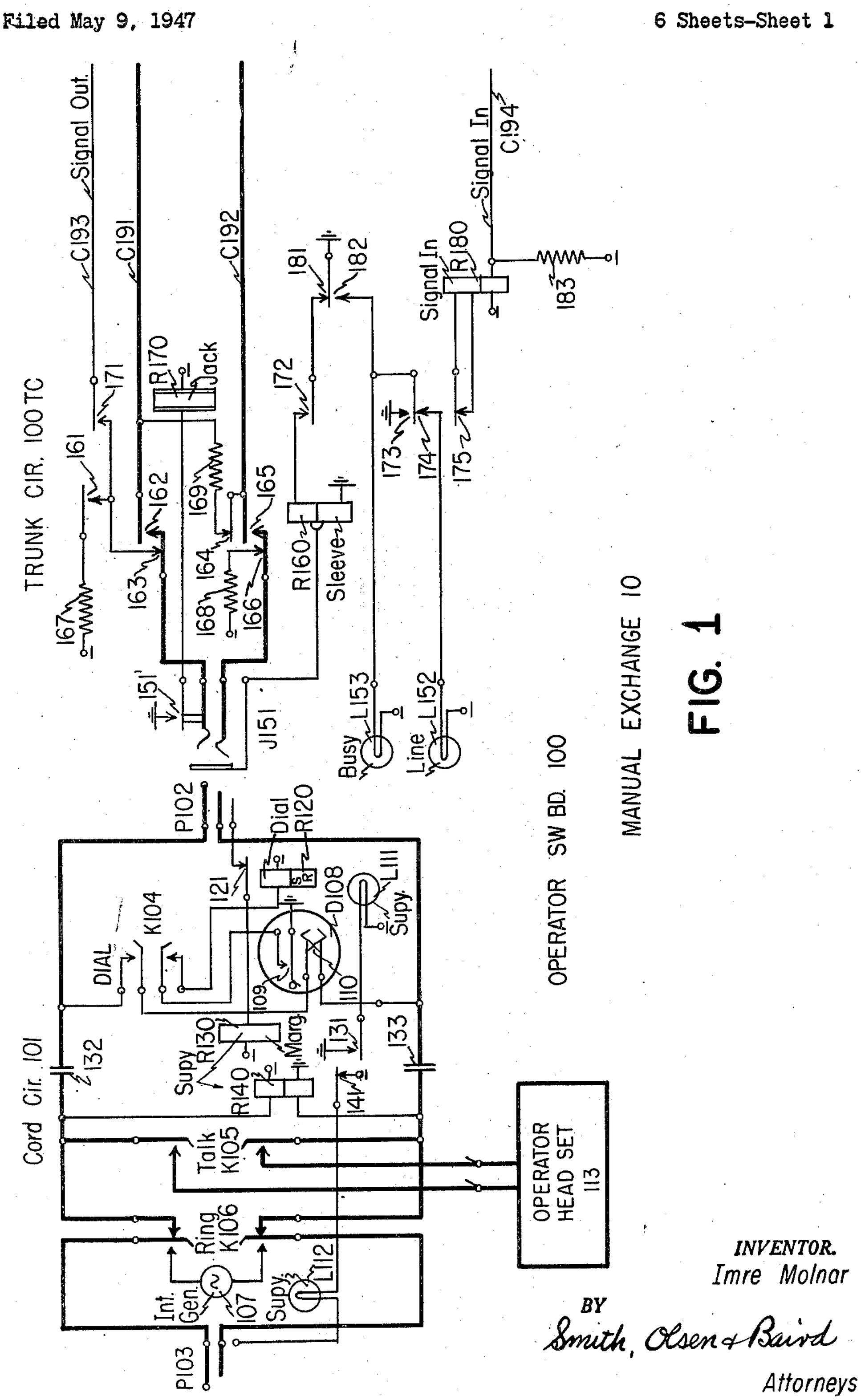

The present invention relates to radiotelephone systems and more particularly to such systems involving exchanges of the automatic dial type.

In prior radiotelephone systems, connections have been extended from calling subscriber substations by way of automatic switching apparatus to a first manual operator switchboard and then extended by the operator thereat over radio links to a second manual operator switchboard and then extended by the operator thereat by way of automatic switching apparatus to called subscriber substations. In these systems the radio links are employed entirely on a manual basis by the operators at the two terminating manual switchboards. While systems of this character are entirely satisfactory in operation, large switchboards, staffed by a great number of operators, are required in order to complete the calls between the subscriber substations in the various automatic exchanges of the system.

Accordingly, it is an object of the present invention to provide a radiotelephone system involving an automatic exchange; wherein connections are extended over the radio links to the automatic switching apparatus in the automatic exchange and then the automatic switching apparatus may be operated to complete the connections to the called subscriber substations therein, and wherein calls initiated at the subscriber substations in the automatic exchange are first extended to the automatic switching apparatus therein and then the automatic switching apparatus is operated to extend the calls over the radio links.

Another object of the invention is to provide in a radiotelephone system, improved automatic switching apparatus that may be selectively operated over an associated radio link to extend a connection.

Another object of the invention is to provide in a radiotelephone system, an improved radio link capable of controlling the operation of associated automatic switching apparatus and responsive to the usual audible signals returned from the automatic switching apparatus incident to the various switching operations thereof.

Another object of the invention is to provide in a radiotelephone system, improved switching apparatus that is capable of seizing and controlling the operation of an associated radio link.

Another object of the invention is to provide in a radiotelephone system, an improved radio link controllable from associated automatic switching apparatus and responsive to the usual audible signals forwarded from the automatic switching apparatus incident to the various switching operations thereof.

A further object of the invention is to provide in a radiotelephone system comprising a manual exchange and an automatic exchange interconnected by radio links, an improved arrangement whereby connections may be extended from an operator switchboard in the manual exchange over the radio links to called subscriber substations in the automatic exchange, and connections may be extended from calling subscriber substations in the automatic exchange over the radio links to the operator switchboard in the manual exchange.

A further object of the invention is to provide in a radiotelephone system comprising a plurality of automatic exchanges interconnected by radio links, an improved arrangement whereby calling subscriber substations in a first automatic exchange may extend connections via the associated automatic switching apparatus over the radio links to the automatic switching apparatus in a second of the automatic exchanges and then operate the last-mentioned automatic switching apparatus to extend connections to called subscriber substations in the second automatic exchange.

A still further object of the invention is to provide in a radiotelephone system, radio links comprising improved duplex control and supervisory facilities.

Further features of the invention pertain to the particular arrangement of the circuit elements of the system, whereby the above-outlined and additional operating features thereof are attained.

Figure 5:
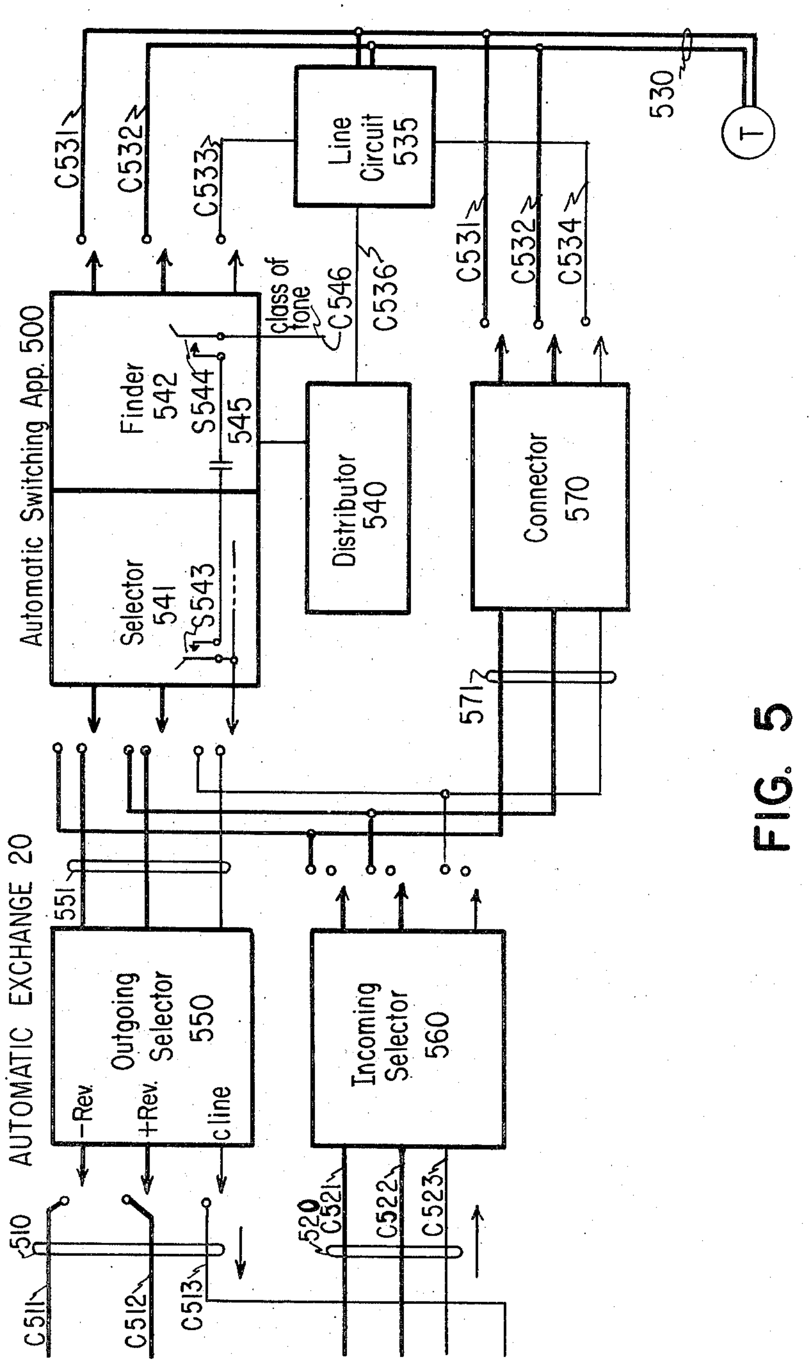
Figure 6:
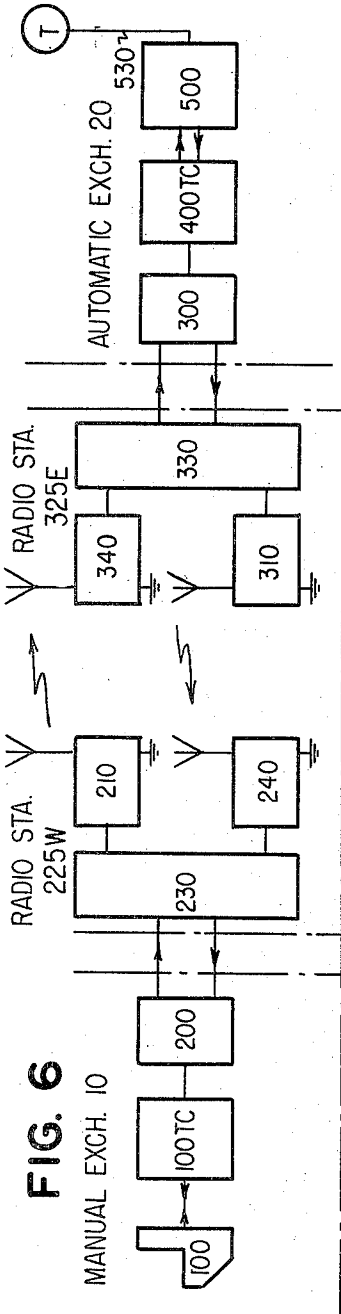
Figure 7:
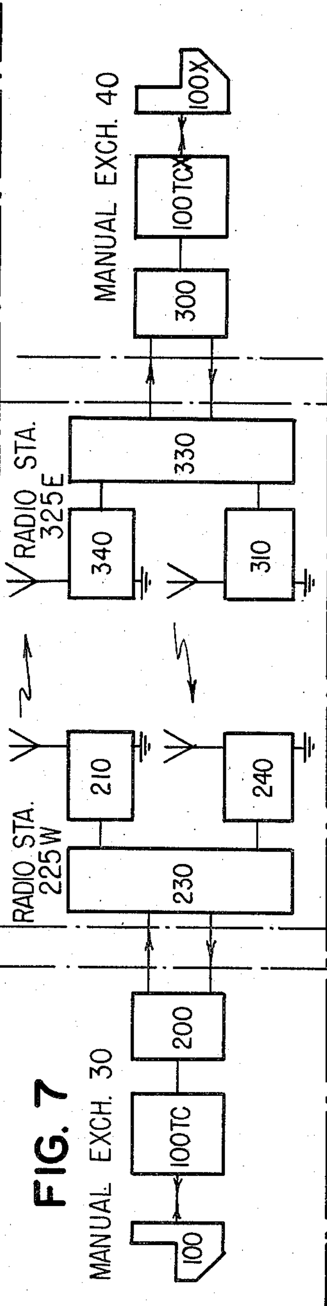
Figure 8:
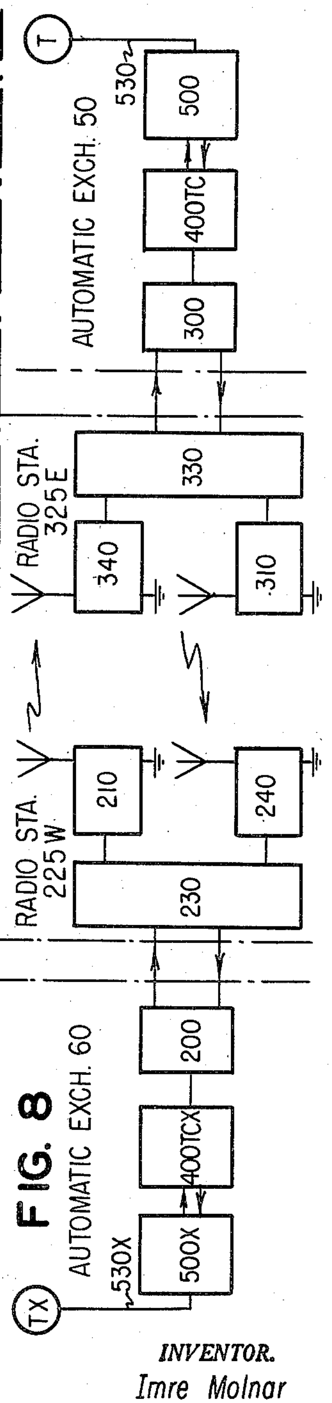

The invention, both as to its organization and method of operation, together with further objects and advantages thereof, will best be understood by reference to the following specification taken in connection with the accompanying drawings in which Figure 6 is a diagrammatic illustration of a radiotelephone system embodying the present invention and comprising a manual exchange 10, an automatic exchange 20, and two radio stations 225W and 325E; Fig. 7 is a diagrammatic illustration of a modified radiotelephone system embodying the present invention and comprising a manual exchange 30, a manual exchange 40, and two radio stations 225W and 325E; Fig. 8 is a diagrammatic illustration of a further modified radiotelephone system embodying the present invention and comprising an automatic exchange 50, an automatic exchange 60, and two radio stations 225W and 325E; and Figs. 1 to 5, inclusive, taken together illustrate the details of the apparatus incorporated in the radiotelephone system illustrated in Fig. 6 and embodying the features of the invention as briefly outlined above. In order to form a unified diagram, Figs. 1 to 5, inclusive, should be arranged from left to right in end-to-end relation.

Figure 2:
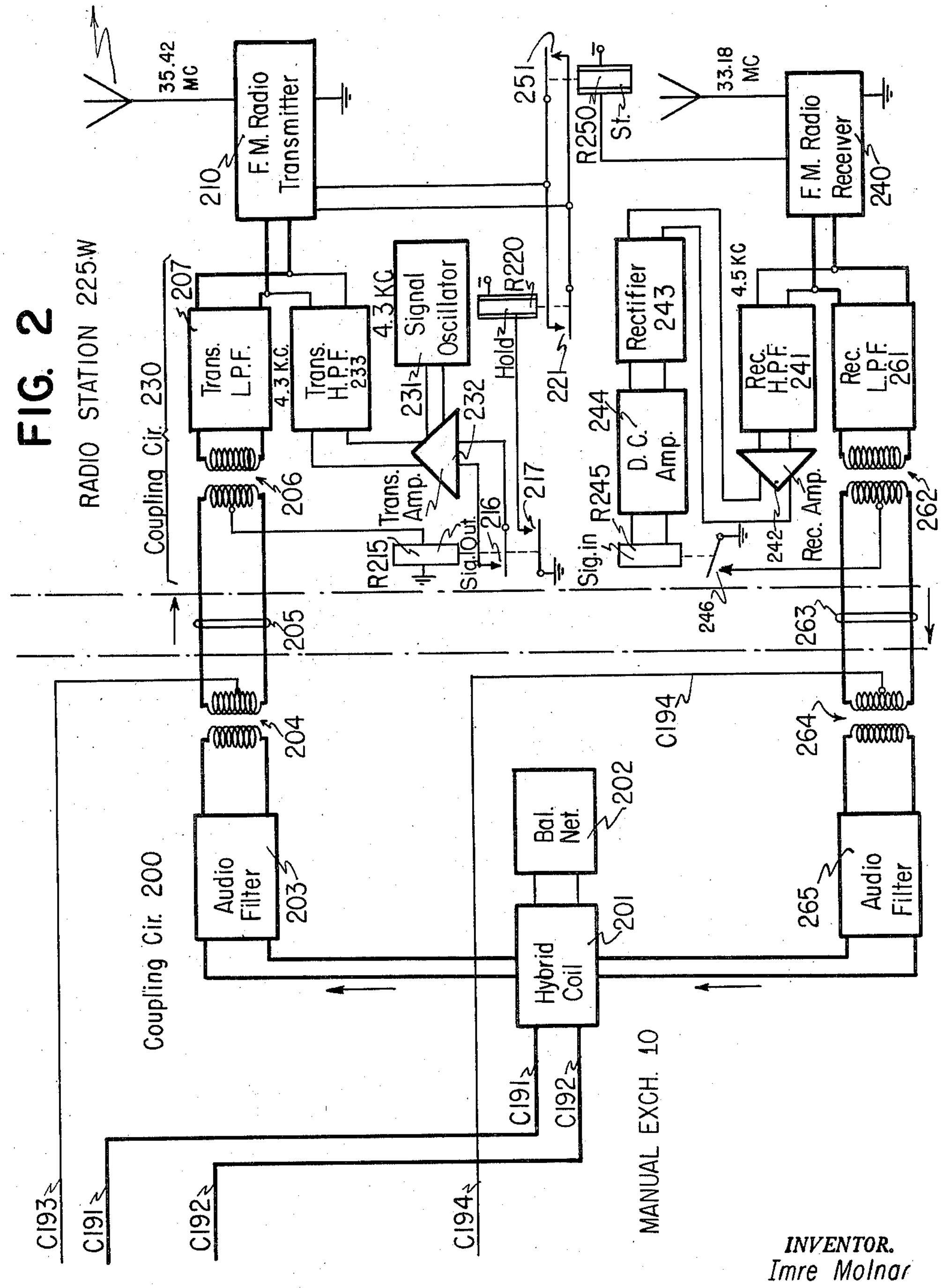
Figure 3:
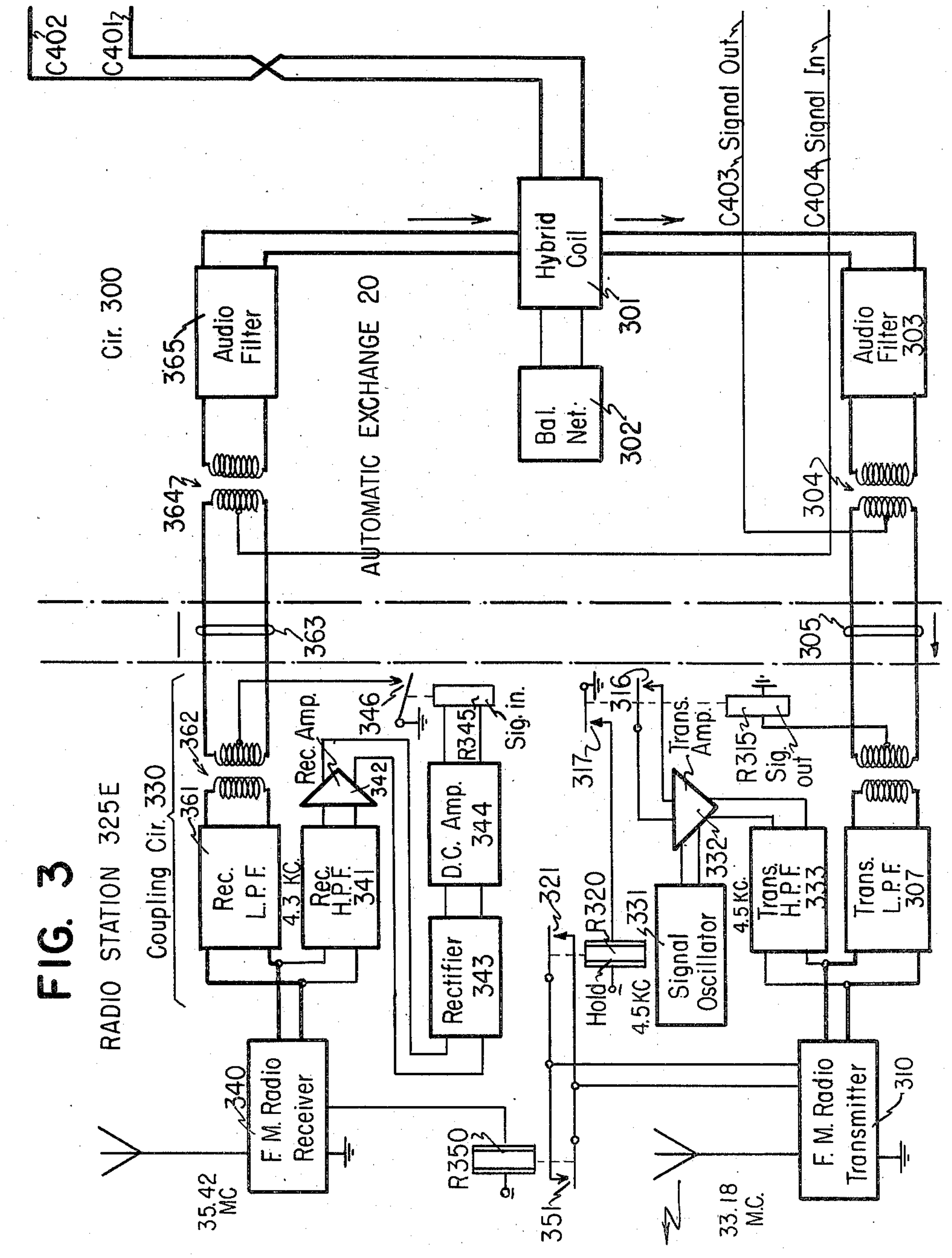
Figure 4:
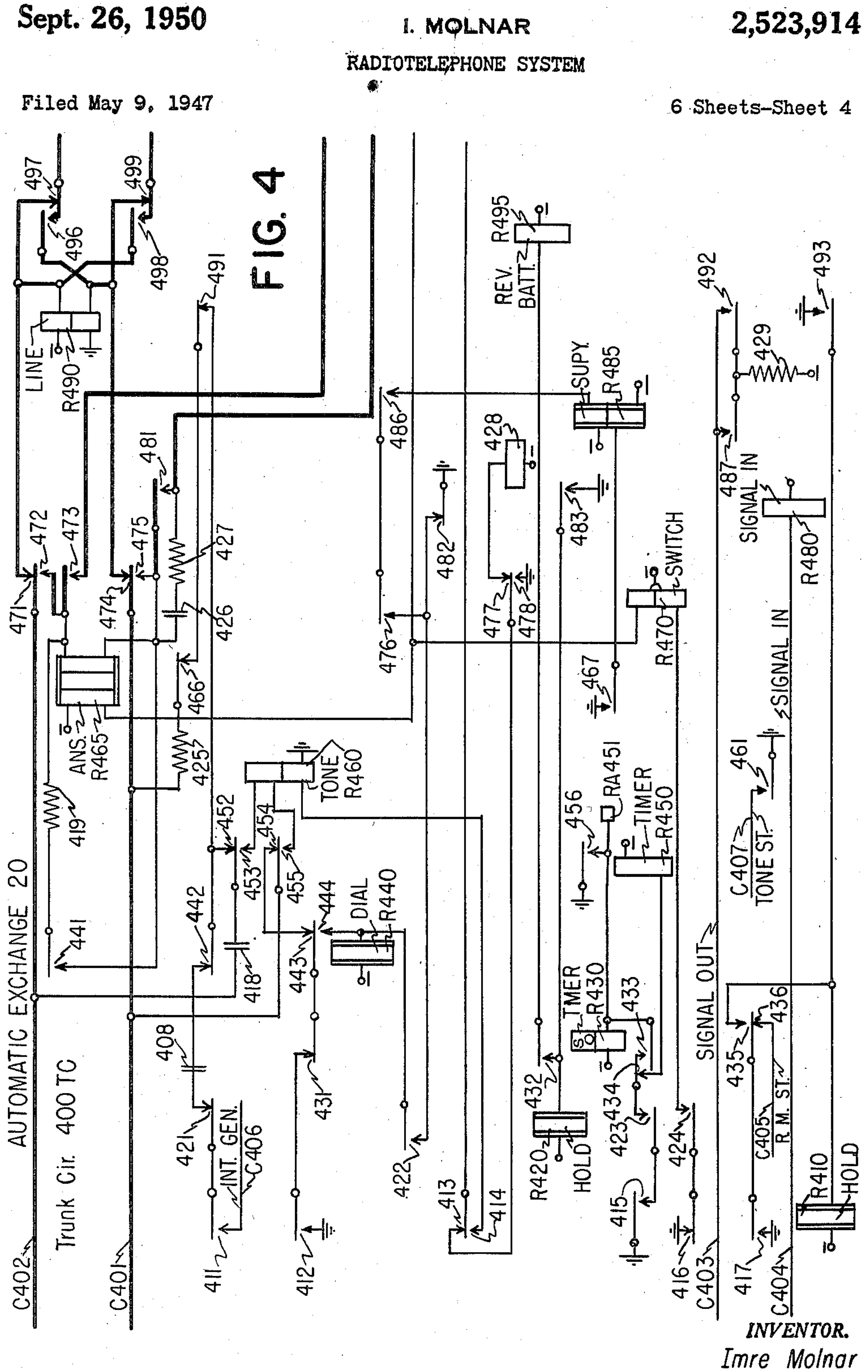

More particularly, Fig. 1 illustrates the details of the cord circuit disposed at the operator switchboard and the details of the trunk circuit, both disposed in the manual exchange 10 in the radiotelephone system of Fig. 6; Fig. 2 illustrates the details of the coupling circuit disposed in the manual exchange 10 and the details of the coupling circuit disposed in the radio station 225W, and diagrammatically the F. M. radio receiver disposed in the radio station 225W; Fig. 3 illustrates diagrammatically the F. M. radio transmitter and the F. M. radio receiver disposed in the radio station 325E and the details of the coupling circuit disposed in the radio station 325E and the details of the coupling circuit disposed in the automatic exchange 20; Fig. 4 illustrates the details of the trunk circuit disposed in the automatic exchange 20; and Fig. 5 illustrates the general arrangement of the automatic switching apparatus disposed in the automatic exchange 20.

Referring now more particularly to Fig. 6, the radiotelephone system there illustrated comprises a manual exchange 10 serving a group of subscriber substations, not shown, an automatic exchange 20 serving a plurality of groups of subscriber substations, one of the groups including the subscriber substation T, and two spaced-apart radio stations 225W and 325E respectively associated with the manual exchange 10 and with the automatic exchange 20. The manual exchange 10 also comprises an operator switchboard 100 having access to a trunk circuit 100TC that, in turn, is connected to an associated coupling circuit 200. Also the automatic exchange 20 comprises automatic switching apparatus 500, a trunk circuit 400TC having access to and being accessible to the automatic switching apparatus 500, that, in turn, is connected to an associated coupling circuit 300. The radio station 225W comprises an F. M. radio transmitter 210 and an F. M. radio receiver 240, both connected to an associated coupling circuit 230. The coupling circuit 200 in the manual exchange 10 is connected to the coupling circuit 230 in the radio station 225W by a trunk 205 incoming to the coupling circuit 230 and associated with the F. M. radio transmitter 210 and by a trunk 263 outgoing from the coupling circuit 230 and associated with the F. M. receiver 240. Similarly, the radio station 325E comprises an F. M. radio transmitter 310 and an F. M. radio receiver 340, both connected to an associated coupling circuit 330. The coupling circuit 300 in the automatic exchange 20 is connected to the coupling circuit 330 in the radio station 325E by a trunk 305 incoming to the coupling circuit 330 and associated with the F. M. radio transmitter 310 and by a trunk 363 outgoing from the coupling circuit 330 and associated with the F. M. receiver 340.

As shown in Fig. 1, the operator switchboard 100 comprises a number of cord circuits, including the cord circuit 101, and standard common equipment, including a headset 113, a dial D108 and an interrupter generator 107. Further, the cord circuit 101 comprises two plugs P102 and P103, a dial key K104 operative to connect the dial D108 thereto, a talk key K105 operative to connect the headset 113 thereto, and a ring key K106 operative to connect the interrupter generator 107 thereto. Also, the cord circuit 101 comprises a supervisory lamp L111 associated with the plug P102, a supervisory lamp L112 associated with the plug P103, a supervisory relay R130 associated with the supervisory lamp L111, a supervisory relay R140 associated with the supervisory lamp L112, and a dial relay R120 associated with the dial key K104 and with the dial D108.

Also as shown in Fig. 1, the trunk circuit 100TC terminates in a jack J151 at the operator switchboard 100 and comprises a line lamp L152, a busy lamp L153 and a relay group including a sleeve relay R160, a jack relay R170 and a signal-in relay R180. The trunk circuit 100TC is connected to the coupling circuit 200 by two line conductors C191 and C192, a signal-out conductor C193 and a signal-in conductor C194 as explained more fully hereinafter.

As shown in Fig. 4, the trunk circuit 400TC terminates in an outgoing trunk 510 accessible to the automatic switching apparatus 500 and an incoming trunk 520 having access to the automatic switching apparatus 500 as previously noted; and comprises a relay group including a hold relay R410, a hold relay R420, a timer relay R430, a dial relay R440, a timer relay R450, a tone relay R460, an answer relay R465, a switch relay R470, a signal-in relay R480, a supervisory relay R485, a line relay R490 and a reverse battery relay R495. The trunk circuit 400TC is connected to the coupling circuit 300 by two line conductors C401 and C402, a signal-out conductor C403 and a signal-in conductor C404 as explained more fully hereinafter.

As shown in Fig. 5, the subscriber substation T has a subscriber line 530 extending thereto, with which a line circuit 535 is individually associated. The automatic switching apparatus 500 comprises a plurality of groups of finder-selector links, each provided with an associated distributor, and corresponding to the groups of subscriber substations. One of the groups of finder-selector links includes the finder 542 and the selector 541 and is provided with the individually associated distributor 540; which group of finder-selector links is associated with the group of subscriber substations, including the subscriber substation T. Also, the automatic switching apparatus 500 comprises a plurality of groups of connectors respectively associated with the groups of subscriber substations. One of the groups of connectors includes the connector 570 and is associated with the group of subscriber substations, including the subscriber substation T. Also, the automatic switching apparatus 500 comprises a group of outgoing selectors, including the outgoing selector 550, and an incoming selector 560. More particularly, the finder 542 of the finder-selector link illustrated has access to the subscriber line 530 extending to the subscriber substation T; while the selector 541 of the finder-selector link illustrated has access to the connector 570 by way of the associated trunk 571, and has access to the outgoing selector 550 by way of the associated trunk 551. Also, the outgoing selector 550 has access to the outgoing trunk 510 extending into the trunk circuit 400TC; while the incoming trunk 520 extending from the trunk circuit 400TC is terminated in the incoming selector 560. Finally, the incoming selector 560 has access to the connector 570 by way of the associated trunk 571.

Preferably, the finders 542, etc., the selectors 541, etc., the outgoing selectors 550, etc., the incoming selector 560 and the connectors 570, etc., are of the well known Strowger types. Also, the finder 542 comprises a plurality of sets of post normal switch springs, one of which is indicated at S544, which sets of switch springs are actuated selectively in response to operation of the finder 542 different numbers of steps in the vertical direction in the selection of the corresponding ten line groups; and which sets of switch springs are connected to individually associated class tone conductors. Specifically, the set of switch springs S544 is actuated into closed circuit relation in order to connect the associated class tone conductor C546 to the associated condenser 545 when the finder 542 is operated a predetermined number of steps in the vertical direction to select the ten line group of subscriber lines, including the subscriber line 530, extending to the subscriber substation T illustrated. Thus it will be understood that the subscriber substation T is in a given ten line group rendered a particular class of service, as indicated by the signal present on the class tone conductor C546.

Similarly, the selector 541 comprises a set of post normal switch springs S543 which is operated into closed circuit relation when the selector 541 is operated to a predetermined level to select the trunk 551 extending to the outgoing selector 550 and indicative of a trunk call from the automatic exchange 20 to the manual exchange 10.

As shown in Fig. 2, the coupling circuit 200 in the manual exchange 10 comprises a hybrid coil 201 terminating the line conductors C191 and C192 extending to the trunk circuit 100TC and provided with a balancing network 202. Also the hybrid coil 201 is included in an outgoing channel provided with an audio filter 203 and terminating in the primary winding of a repeating coil 204; the second winding of the repeating coil 204 terminating the trunk 205 extending from the coupling circuit 200 in the manual exchange 10 to the coupling circuit 230 in the radio station 225W. The signal-out conductor C193 extending from the trunk circuit 100TC is connected to the simplex of the secondary winding of the repeating coil 204 and, consequently, to the simplex of the trunk 205. Also the hybrid coil 201 is included in an incoming channel provided with an audio filter 265 and terminating in the secondary winding of a repeating coil 264; the primary winding of the repeating coil 264 terminating the trunk 263 extending from the coupling circuit 230 in the radio station 225W to the coupling circuit 200 in the manual exchange 10. The signal-in conductor C194 extending to the trunk circuit 100TC is connected to the simplex of the primary winding of the repeating coil 264 and, consequently, to the simplex of the trunk 263.

As shown in Fig. 3, the coupling circuit 300 in the automatic exchange 20 comprises a hybrid coil 301 terminating the line conductors C401 and C402 extending to the trunk circuit 400TC and provided with a balancing network 302. Also the hybrid coil 301 is included in an outgoing channel provided with an audio filter 303 and terminating in the primary winding of a repeating coil 304; the secondary winding of the repeating coil 304 terminating the trunk 305 extending from the coupling circuit 300 in the automatic exchange 20 to the coupling circuit 330 in the radio station 325E. The signal-out conductor C403 extending from the trunk circuit 400TC is connected to the simplex of the secondary winding of the repeating coil 304 and, consequently, to the simplex of the trunk 305. Also the hybrid coil 301 is included in an incoming channel provided with an audio filter 365 and terminating in the secondary winding of a repeating coil 364; the primary winding of the repeating coil 364 terminating the trunk 363 extending from the coupling circuit 330 in the radio station 325E to the coupling circuit 300 in the automatic exchange 20. The signal-in conductor C404 extending to the trunk circuit 400TC is connected to the simplex of the primary winding of the repeating coil 364 and, consequently, to the simplex of the trunk 363.

As shown in Fig. 2, the coupling circuit 230 in the radio station 225W comprises a repeating coil 206, the primary winding of which terminates the trunk 205 extending from the coupling circuit 200 in the manual exchange 10; the secondary winding of the repeating coil 206 extending to a transmitting low pass filter 207 that, in turn, is connected to the modulating circuit of the F. M. radio transmitter 210. Also the modulating circuit of the F. M. radio transmitter 210 is connected by way of a transmitting high pass filter 233 to a transmitting amplifier 232 which, in turn, is connected to a signal oscillator 231. Also the coupling circuit 230 is provided with a signal-out relay R215 connected to the simplex of the primary winding of the repeating coil 206 and, consequently, to the simplex of the trunk 205 extending from the coupling circuit 200 in the manual exchange 10; which signal-out relay R215 is provided with contacts 216 arranged in the plate circuit of the transmitting amplifier 232. Also the coupling circuit 230 comprises a hold relay R220 that is operated by the signal-out relay R215 and provided with contacts 221 included in the start circuit of the F. M. radio transmitter 210. The transmitting low pass filter 207 is arranged to couple audio frequency from the trunk 205 to the modulating circuit of the F. M. radio transmitter 210 and to block the passage of intermediate frequency therethrough from the modulating circuit of the F. M. radio transmitter 210 back to the trunk 205. The signal oscillator 231 is arranged to produce an intermediate 4.3 kc. signal which signal may be amplified by the transmitting amplifier 232 and impressed through the transmitting high pass filter 233 upon the modulating circuit of the F. M. radio transmitter 210. Also the transmitting high pass filter 233 blocks the passage therethrough of audio frequency from the modulating circuit of the F. M. radio transmitter 210 back into the transmitting amplifier 232.

Further, the coupling circuit 230 comprises a repeating coil 262, the secondary winding of which terminates the trunk 263 extending to the coupling circuit 200 in the manual exchange 10; the primary winding of the repeating coil 262 being connected by way of a receiving low pass filter 261 to the output circuit of the F. M. radio receiver 240. Also the coupling circuit 230 comprises a signal-in relay R245 provided with contacts 246 that are adapted when closed to connect ground potential to the simplex of the secondary winding of the repeater coil 262 and, consequently, to the simplex of the trunk 263 extending to the coupling circuit 200 in the manual exchange 10. Also the coupling circuit 230 comprises a receiving high pass filter 241 connected between the output circuit of the F. M. radio receiver 240 and a receiving amplifier 242; the output of the receiving amplifier 242 being connected directly to a rectifier 243 that, in turn, is connected to a D. C. amplifier 244. The output of the D. C. amplifier 244 is connected to the winding of the signal-in relay R245. The D. C. amplifier 244 normally supplies sufficient current to the winding of the signal-in relay R245 to maintain the latter relay in its operated position; whereby the signal-in relay R245 maintains interrupted, at is contacts 246, the previously mentioned path for applying ground potential to the simplex of the secondary winding of the repeating coil 262 and, consequently, to the simplex of the trunk 263. The receiving low pass filter 261 is arranged to couple audio frequency from the output circuit of the F. M. radio receiver 240 to the trunk 263 and to block the passage of intermediate frequency therethrough from the output circuit of the F. M. radio receiver 240 to the trunk 263. The receiving high pass filter 241 is arranged to pass the intermediate 4.5 kc. signal from the output circuit of the F. M. radio receiver 240 to the receiving amplifier 242 and to block the passage therethrough of audio frequency from the output circuit of the F. M. radio receiver 240 to the receiving amplifier 242. The intermediate 4.5 kc. signal passed into the receiving amplifier 242 is amplified and passed into the rectifier 243; wherein it is rectified and passed into the D. C. amplifier 244. When the rectified signal is thus passed into the D. C. amplifier 244, the bias in the D. C. amplifier 244 is increased in order to cause the output current therefrom to the winding of the signal-in relay R245 to be reduced sufficiently to bring about the restoration of the signal-in relay R245. Upon restoring the signal-in relay R245 completes, at the contacts 246, the previously mentioned path for applying ground potential to the simplex of the secondary winding of the repeating coil 262 and, consequently, to the simplex of the trunk 263.

The F. M. radio receiver 240 comprises among other apparatus, a detector stage, an output stage and a squelch circuit coupling the detector stage to the output stage; whereby the sensitivity of the output stage is greatly reduced when the output of the detector stage does not include either the 4.5 kc. or an audio component. On the other hand, when the output of the detector stage includes either the 4.5 kc. or an audio component, the sensitivity of the output stage is greatly increased. This squelch circuit arrangement prevents the F. M. radio receiver 240 from being noisy when a radio frequency carrier signal is being received that is not being modulated by the 4.5 kc. or an audio signal. Also the coupling circuit 230 comprises a start relay R250 included in the squelch circuit of the F. M. radio receiver 240; which start relay R250 is operated when the squelch circuit is operated to increase the sensitivity of the output stage of the F. M. radio receiver 240. The start relay R250 is provided with contacts 251 included in the start circuit of the F. M. radio transmitter 210; whereby operation of the F. M. radio transmitter 210 is initiated, in the event it is restored, when the F. M. radio receiver 240 receives the radio frequency carrier modulated by either the 4.5 kc. or an audio signal.

Finally, it is noted that the F. M. radio transmitter 210 transmits a frequency of 35.42 mc.; which radio frequency carrier may be modulated both by audio frequency signals received over the trunk 205 from the coupling circuit 200 and by the 4.3 kc. signal from the intermediate frequency generator or signal oscillator 231. Similarly, the F. M. radio receiver 240 receives at a frequency of 33.18 mc.; which radio frequency carrier may be modulated both by audio frequency signals and by the intermediate 4.5 kc. signal.

As shown in Fig. 3, the coupling circuit 330 in the radio station 325E comprises a repeating coil 306, the primary winding of which terminates the trunk 305 extending from the coupling circuit 300 in the automatic exchange 20; the secondary winding of the repeating coil 306 extending to a transmitting low pass filter 307 that, in turn, is connected to the modulating circuit of the F. M. radio transmitter 310. Also the modulating circuit of the F. M. radio transmitter 310 is connected by way of a transmitting high pass filter 333 to a transmitting amplifier 332 which, in turn, is connected to a signal oscillator 331. Also the coupling circuit 330 is provided with a signal-out relay R315 connected to the simplex of the primary winding of the repeating coil 306 and, consequently, to the simplex of the trunk 305 extending from the coupling circuit 300 in the automatic exchange 20; which signal-out relay R315 is provided with contacts 316 arranged in the plate circuit of the transmitting amplifier 332. Also the coupling circuit 330 comprises a hold relay R320 that is operated by the signal-out relay R315 and provided with contacts 321 included in the start circuit of the F. M. radio transmitter 310. The transmitting low pass filter 307 is arranged to couple audio frequency from the trunk 305 to the modulating circuit of the F. M. radio transmitter 310 and to block the passage of intermediate frequency therethrough from the modulating circuit of the F. M. radio transmitter 310 back to the trunk 305. The signal oscillator 331 is arranged to produce an intermediate 4.5 kc. signal which signal may be amplified by the transmitting amplifier 332 and impressed through the transmitting high pass filter 333 upon the modulating circuit of the F. M. radio transmitter 310. Also the transmitting high pass filter 333 blocks the passage therethrough of audio frequency from the modulating circuit of the F. M. radio transmitter 310 back into the transmitting amplifier 332.

Further, the coupling circuit 330 comprises a repeating coil 362, the secondary winding of which terminates the trunk 363 extending to the coupling circuit 300 in the automatic exchange 20; the primary winding of the repeating coil 362 being connected by way of a receiving low pass filter 361 to the output circuit of the F. M. radio receiver 340. Also the coupling circuit 330 comprises a signal-in-relay R345 provided with contacts 346 that are adapted when closed to connect ground potential to the simplex of the secondary winding of the repeating coil 362 and, consequently, to the simplex of the trunk 363 extending to the coupling circuit 300 in the automatic exchange 20. Also the coupling circuit 330 comprises a receiving high pass filter 341 connected between the output circuit of the F. M. radio receiver 340 and a receiving amplifier 342; the output of the receiving amplifier 342 being connected directly to a rectifier 343 that, in turn, is connected to a D. C. amplifier 344. The output of the D. C. amplifier 344 is connected to the winding of the signal-in relay R345. The D. C. amplifier 344 normally supplies sufficient current to the winding of the signal-in relay R345 to maintain the latter relay in its operated position; whereby the signal-in relay R345 maintains interrupted, at its contacts 346, the previously mentioned path for applying ground potential to the simplex of the secondary winding of the repeating coil 362 and, consequently, to the simplex of the trunk 363. The receiving low pass filter 361 is arranged to couple audio frequency from the output circuit of the F. M. radio receiver 340 to the trunk 363 and to block the passage of intermediate frequency therethrough from the output circuit of the F. M. radio receiver 340 to the trunk 363. The receiving high pass filter 341 is arranged to pass the intermediate 4.3 kc. signal from the output circuit of the F. M. radio receiver 340 to the receiving amplifier 342 and to block the passage therethrough of audio frequency from the output circuit of the F. M. radio receiver 340 to the receiving amplifier 342. The intermediate 4.3 kc. signal passed into the receiving amplifier 342 is amplified and passed into the rectifier 343; wherein it is rectified and passed into the D. C. amplifier 344. When the rectified signal is thus passed into the D. C. amplifier 344, the bias in the D. C. amplifier 344 is increased in order to cause the output current therefrom to the winding of the signal-in relay R345 to be reduced sufficiently to bring about the restoration of the signal-in relay R345. Upon restoring the signal-in relay R345 completes, at the contacts 346, the previously mentioned path for applying ground potential to the simplex of the secondary winding of the repeating coil 362 and, consequently, to the simplex of the trunk 363.

The F. M. radio receiver 340 comprises among other apparatus, a detector stage, an output stage and a squelch circuit coupling the detector stage to the output stage; whereby the sensitivity of the output stage is greatly reduced when the output of the detector stage does not include either the 4.3 kc. or an audio component. On the other hand, when the output of the detector stage includes either the 4.3 kc. or an audio component, the sensitivity of the output stage is greatly increased. This squelch circuit arrangement prevents the F. M. radio receiver 340 from being noisy when a radio frequency carrier signal is being received that is not being modulated by the 4.3 kc. or an audio signal. Also, the coupling circuit 330 comprises a start relay R350 included in the squelch circuit of the F. M. radio receiver 340; which start relay R350 is operated when the squelch circuit is operated to increase the sensitivity of the output stage of the F. M. radio receiver 340. The start relay R350 is provided with contacts 351 included in the start circuit of the F. M. radio transmitter 310; whereby operation of the F. M. radio transmitter 310 is initiated, in the event it is restored, when the F. M. radio receiver 340 receives the radio frequency carrier modulated by either the 4.3 kc. or an audio signal.

Finally, it is noted that the F. M. radio transmitter 310 transmits at a frequency of 33.18 mc.; which radio frequency carrier may be modulated both by audio frequency signals received over the trunk 305 from the coupling circuit 300 and by the 4.5 kc. signal from the intermediate frequency generator or signal oscillator 331. Similarly, the F. M. radio receiver 340 receives at a frequency of 35.42 mc.; which radio frequency carrier may be modulated both by audio frequency signals and by the intermediate 4.3 kc. signal.

A better understanding of the connection and arrangement of the apparatus incorporated in the radiotelephone system illustrated in Fig. 6 and briefly described above will be facilitated from a consideration of the extension of connections involving the manual exchange 10 and the automatic exchange 20.

Considering now the extension of a connection between the manual exchange 10 and the automatic exchange 20, and assuming that a call has been extended from a calling subscriber substation, not shown, in the manual exchange 10 to the operator switchboard 100 therein and that the operator at the switchboard 100 has answered the call utilizing the cord circuit 101, at this time the plug P103 of the cord circuit 101 has been inserted into the jack terminating the subscriber line extending to the calling subscriber substation and the talk kay K105 has been operated, in order to connect the operator headset 113 to the cord circuit 101. At this time the operator at the switchboard 100 learns that the subscriber at the calling subscriber substation in the manual exchange 10 desires to converse with a subscriber in the automatic exchange 20, such, for example, as the subscriber at the called subscriber substation T. The operator at the switchboard 100, observing the condition of the trunk circuit 100TC, as indicated by the unlighted busy lamp L153, selects the trunk circuit mentioned and inserts the plug P102 of the cord circuit 101 into the terminating jack J151, assuming that the trunk circuit 100TC is idle at this time.

When the plug P102 is inserted into the jack J151 the contacts 151' thereof are operated, completing an obvious circuit for operating the jack relay R170 in the trunk circuit 100TC. Also, a series circuit, including the contacts 121, is completed for energizing the supervisory relay R130 in the cord circuit 101 and the lower winding of the sleeve relay R160 in the trunk circuit 100TC, whereby the sleeve relay R160 operates. However, the supervisory relay R130 does not operate as it is of the marginal type. Upon operating, the jack relay R170 completes, at the contacts 173, an obvious circuit for illuminating the busy lamp L153, thereby to indicate the busy condition of the trunk circuit 100TC; and interrupts, at the contacts 175, an obvious path for short-circuiting the upper winding of the signal-in relay R180 in order to increase the speed of response of the latter relay. Also, the jack relay R170 completes, at the contacts 172, a circuit, including the contacts 181, for energizing the upper winding of the sleeve relay R160 in multiple with the lower winding thereof and in series with the winding of the supervisory relay R130, whereby the supervisory relay R130 operates. Upon operating, the supervisory relay R130 completes, at the contacts 131, an obvious circuit for illuminating the supervisory lamp L111 in the cord circuit 101. Finally, upon operating, the jack relay R170 completes, at the contacts 171, a circuit, including the contacts 163 and 166, for applying battery potential by way of the resistor 168 to the signal-out conductor C193, assuming that the dial key K104 in the cord circuit 101 is operated at this time; which application of resistance battery potential to the signal-out conductor C193 completes a circuit for operating the signal-out relay R215 in the coupling circuit 230 at the radio station 225W. The above mentioned circuit extends from battery by way of the resistor 168, the contacts 166, the ring of the jack J151, the ring of the plug P102, the impulse contacts 110 of the dial D108, the upper contacts of the dial key K104, the tip of the plug P102, the tip of the jack J151, the contacts 163 and 171, the signal-out conductor C193, the simplex of the secondary winding of the repeating coil 204, the trunk 205, the simplex of the primary winding of the repeating coil 206 and the winding of the signal-out relay R215 to ground potential. Upon operating, the sleeve relay R160 completes, at the contacts 161, a multiple circuit, including the contacts 171, for applying battery potential by way of the resistor 167 to the signal-out conductor C193; and then interrupts, at the contacts 163 and 166, the above-traced original path for applying battery potential by way of the resistor 168 to the signal-out conductor C193. Also, the sleeve relay R160 interrupts, at the contacts 164, a normally completed termination circuit, including the resistor 169, between the line conductors C191 and C192 extending between the trunk circuit 100TC and the hybrid coil 201 in the coupling circuit 200. Finally, the sleeve relay R160 completes, at the contacts 162 and 165, a connection between the line conductors C191 and C192 and the tip and ring of the jack J151 and, consequently, to the tip and ring of the plug P102, which at this time are operatively connected together by way of the upper contacts of the dial key K104 and the impulse contacts 110 of the dial D108.

The operator at the switchboard 100 then proceeds to dial the first digit of the directory number of the called subscriber substation T in the automatic exchange 20. When the dial D108 is thus operated the off-normal springs 109 thereof are first actuated into engagement, thereby to complete a circuit, including the lower contacts of the dial key K104, for operating the dial relay R120 in the cord circuit 101. Upon operating, the dial relay R120 interrupts, at the contacts 121, the previously traced series circuit for energizing the winding of the supervisory relay R130 in the cord circuit 101 and the upper and lower multiply connected windings of the sleeve relay R160 in the trunk circuit 100TC, whereby the relays mentioned restore. Upon restoring, the supervisory relay R130 interrupts, at the contacts 131, the previously mentioned circuit for illuminating the supervisory lamp L111 in the cord circuit 101; and, upon restoring, the sleeve relay R160 recompletes, at the contacts 163 and 166, the previously traced original path for applying battery potential by way of the resistor 168 to the signal-out conductor C193, which path includes the upper contacts of the dial key K104 and the impulse contacts 110 of the dial D108, both in the cord circuit 101, as previously noted. Further, the sleeve relay R160 interrupts, at the contacts 161, the previously traced alternative path for applying battery potential by way of the resistor 167 to the signal-out conductor C193; interrupts, at the contacts 162 and 165, the previously traced path, including the upper contacts of the dial key K104 and the impulse contacts 110 of the dial D108 in the cord circuit 101, across the line conductors C191 and C192; and recompletes, at the contacts 164, the previously mentioned termination circuit including the resistor 169 between the line conductors C191 and C192. At this time battery potential is applied by way of the resistor 168 to the signal-out conductor C193 over the above-traced path including the impulse contacts 110 of the dial D108 in the cord circuit 101. Accordingly, as the dial D108 is returned to its normal position the impulse contacts 110 thereof are operated one or more times, corresponding to the number of impulses in the digit dialed, effecting interruption and then recompletion a corresponding number of times of the above-traced path for applying battery potential by way of the resistor 168 to the signal-out conductor C193, whereby the signal-out relay R215 in the coupling circuit 230 follows the impulses of the present digit. At the conclusion of the first digit when the dial D108 in the cord circuit 101 is returned to its normal position, the impulse contacts 110 thereof are maintained in closed circuit position and the off-normal contacts 109 thereof are actutaed into disengagement in order to interrupt the circuit for maintaining operated the dial relay R120 in the cord circuit 101. Shortly thereafter the dial relay R120 restores, as it is of the slow-to-release type, recompleting, at the contacts 121, the previously traced series circuit for energizing the winding of the supervisory relay R130 in the cord circuit 101 and the multiply connected upper and lower windings of the sleeve relay R160 in the trunk circuit 100TC, causing the relays mentioned to reoperate. Upon reoperating, the supervisory relay R130 again completes, at the contacts 131, the previously mentioned circuit for illuminating the supervisory lamp L111; and, upon reoperating, the sleeve relay R160 recompletes, at the contacts 161, the previously traced alternative path for applying battery potential by way of the resistor 167 to the signal-out conductor C193; and interrupts, at the contacts 163 and 166, the previously traced original path for applying battery potential by way of the resistor 168 to the signal-out conductor C193. In a similar manner the operator at the switchboard 100 dials the second and third digits of the directory number of the called subscriber substation T in the automatic exchange 20 and then, at the conclusion of the dialing of the third digit mentioned, she restores the dial key K104 to its normal position, thereby interrupting the previously traced bridge including the impulse contacts 110 of the dial D108 between the tip and the ring of the plug P102 of the cord circuit 101. At this time the tip and the ring of the plug P102 are operatively connected by way of the condensers 132 and 133 to the tip and the ring of the plug P103 and, consequently, by way of the contacts of the talk key K105 to the operator headset 113.

In view of the foregoing explanation of the manner in which the operator at the switchboard 100 seizes the trunk circuit 100TC utilizing the cord circuit 101, it will be understood that resistance battery potential is first steadily applied to the signal-out conductor C193; and then the application of resistance battery potential to the signal-out conductor C193 is interrupted, at three different times, one or more times each corresponding to the impulses in the three digits mentioned; and then steady resistance battery potential is reapplied to the signal-out conductor C193. Accordingly, the signal-out relay R215 in the coupling circuit 230 operates steadily; then follows the impulses of the three spaced-apart digits mentioned and then operates steadily again. Upon operating the signal-out relay R215 completes, at the contacts 217, an obvious circuit for operating the hold relay R220; whereby the latter relay upon operating completes, at the contacts 221, the start circuit of the F. M. radio transmitter 210 in order to cause operation thereof to transmit the 35.42 mc. radio frequency carrier. Also upon operating the signal-out relay R215 completes, at the contacts 216, the plate circuit of the transmitting amplifier 232 connected to the signal oscillator 231, producing the intermediate 4.3 kc. signal; whereby the transmitting amplifier 232 operates to impress the intermediate 4.3 kc. signal through the transmitting high pass filter 233 upon the modulating circuit of the F. M. radio transmitter 210 in order to cause the 35.42 mc. radio frequency carrier to be modulated by the intermediate 4.3 kc. signal. Each time the signal-out relay R215 restores and then reoperates, during the reception of a digit, it interrupts and then recompletes, at the contacts 217, the previously mentioned circuit for maintaining operated the hold relay R220; however, without effect since the hold relay R220 being of the slow-to-release type, remains operated during the reception of a digit. Also, each time the signal-out relay R215 restores and then reoperates, during the reception of a digit, it interrupts and then recompletes, at the contacts 216, the plate circuit of the transmitting amplifier 232; whereby the transmitting amplifier 232 operates to interrupt and then to project the intermediate 4.3 kc. signal over the transmitting high pass filter 233 to the modulating circuit of the F. M. radio transmitter 210. Accordingly, the transmitting amplifier 232 transmits amplified pulses of the intermediate 4.3 kc. signal through the transmitting high pass filter 233 to the modulating circuit of the F. M. radio transmitter 210 in accordance with the impulses of the digit being received by the signal-out relay R215. Hence, the F. M. radio transmitter 210 operates to transmit unmodulated pulses of 35.42 mc. radio frequency carrier in accordance with the impulses of the digit being received by the signal-out relay R215.

When operation of the F. M. radio transmitter 210 in the radio station 225W is initiated to transmit the 35.42 mc. radio frequency carrier modulated by the intermediate 4.3 kc. signal, the F. M. radio receiver 340 in the radio station 325E receives; whereby the output of the detector stage therein includes the 4.3 kc. component causing the squelch circuit therein to increase the sensitivity of the output stage therein and to operate the start relay R350 in the coupling circuit 330. Upon operating the start relay R350 closes the contacts 351 completing the start circuit of the F. M. radio transmitter 310 in the radio station 325E. At this time the F. M. radio transmitter 310 transmits the unmodulated 33.18 mc. radio frequency carrier, which unmodulated 33.18 mc. radio frequency carrier is received by the F. M. radio receiver 240 in the radio station 225W; however without effect since the output of the detector stage therein does not include the 4.5 kc. component such that the squelch circuit therein is not operative to increase the sensitivity of the output stage therein.

When the F. M. radio receiver 340 in the radio station 325E first receives the 35.42 mc. radio frequency carrier modulated by the intermediate 4.3 kc. signal, the 4.3 kc. component appears in the output stage therein and is passed through the receiving high pass filter 341 into the receiving amplifier 342; which 4.3 kc. component is amplified therein and passed directly into the rectifier 343. The signal is rectified by the rectifier 343 and passed into the D. C. amplifier 344; whereby the bias therein is increased causing the D. C. amplifier 344 to decrease its output to the winding of the signal-in relay R345 sufficiently to cause the latter relay to restore. Upon restoring, the signal-in relay R345 completes, at the contacts 346, a path including the simplex of the secondary winding of the repeating coil 362, the trunk 363 and the simplex of the primary winding of the repeating coil 364 for applying ground potential to the signal-in conductor C404 extending from the coupling circuit 300 to the trunk circuit 400TC in the automatic exchange 20. When the F. M. radio receiver 340 in the radio station 325E then receives the unmodulated pulses of 35.42 mc. radio frequency carrier corresponding to the impulses of the first digit, the 4.3 kc. component is alternately absent and present in the output stage thereof; whereby pulses of the 4.3 kc. component are passed through the receiving high pass filter 341 into the receiving amplifier 342 and amplified and passed to the rectifier 343. The pulses of signal from the rectifier 343 are passed into the D. C. amplifier 344 in order alternately to increase the bias therein; whereby corresponding pulses of current pass to the winding of the signal-in relay R345 causing the latter relay to follow. In view of the foregoing, it will be understood that the signal-in relay R345 in the coupling circuit 330 restores steadily; then follows the impulses of the three spaced-apart digits mentioned; and then restores steadily again. Also during the reception of a digit by the F. M. radio receiver 340 in the radio station 325E, each time the 4.3 kc. component is absent from the output of the detector stage therein, the squelch circuit operates to decrease the sensitivity of the output stage therein and to de-energize the winding of the start relay R350; however without effect since the start relay R350 being of the slow-to-release type, remains operated during the reception of a digit.

Upon first restoring, the signal-in relay R345 in the coupling circuit 330 completes, at the contacts 346, the previously traced path for applying ground potential by way of the simplex of the trunk 363 to the signal-in conductor C404 extending into the trunk circuit 400TC in the automatic exchange 20; which application of ground potential to the signal-in conductor C404 completes an obvious circuit for operating the signal-in relay R480 in the trunk circuit 400TC. Accordingly, the signal-in relay R480 operates steadily; then follows the impulses of the three spaced-apart digits mentioned; and then operates steadily again.

Upon first operating, the signal-in relay R480 completes, at the contacts 481, an obvious path for short-circuiting the resistor 427 and the series connected condenser 426; and completes, at the contacts 483, an obvious circuit for operating the hold relay R420. Upon operating, the hold relay R420 completes at the contacts 424, a circuit, including the contacts 416, for energizing the lower winding of the switch relay R470, thereby to cause the latter relay to operate. Upon operating, the switch relay R470 interrupts, at the contacts 471 and 474, the normal connections between the line conductors C401 and C402 extending from the hybrid coil 301 in the coupling circuit 300 and the line conductors C511 and C512 for the outgoing trunk 510 extending to the trunk circuit 400TC and accessible to the outgoing selector 550. Also, the switch relay R470 completes, at the contacts 472, 473 and 475, a connection between the line conductors C521 and C522 of the incoming trunk 520 extending to the incoming selector 560 and the line conductors C402 and C401 extending to the hybrid coil 301 in the coupling circuit 300. Also, the switch relay R470 completes, at the contacts 473, a path, including the contacts 481, for connecting the right-hand winding of the answer relay R465 across the line conductors C521 and C522 of the incoming trunk 520 extending to the incoming selector 560, thereby to effect the seizure of the incoming selector 560; whereby it is rendered responsive to the first digit transmitted from the operator switchboard 100. Also the switch relay R470 interrupts, at the contacts 477, a normally completed path including the contacts 413 for applying battery potential by way of the impedance 428 to the control conductor C513 of the outgoing trunk 510; and completes, at the contacts 478, a substantially identical path, including the contacts 413, for applying ground potential to the control conductor C513 of the outgoing trunk 510. When battery potential is thus removed from and ground potential is thus applied to the control conductor C513 of the outgoing trunk 510, the marking of the outgoing trunk 510 as idle is removed and the marking of the outgoing trunk 510 as busy is brought about. Accordingly, the outgoing trunk 510, and consequently the trunk circuit 400TC, is marked as busy to the outgoing selectors 550, etc. at this time. When the incoming selector 560 is conditioned to be responsive to the first digit transmitted from the operator switchboard 100 as above noted, ground potential therein is returned over the control conductor C523 of the incoming trunk 520, thereby to complete a circuit for energizing the left-hand winding of the answer relay R465 and a multiple holding circuit for energizing the upper winding of the switch relay R470. The answer relay R465 does not operate at this time, since it is of the shunt field type, and will not operate until the right-hand winding thereof is energized in the opposite direction over the loop circuit extending by way of the line conductors C521 and C522 of the incoming trunk 520 to the incoming selector 560. At this time the radio link has seized the trunk circuit 400TC and the latter trunk circuit has seized the incoming selector 560 rendering it responsive to the first digit transmitted from the operator switchboard 100.

When the first digit is received over the radio link, the signal-in relay R345 in the coupling circuit 330 in the radio station 325E follows repeating, at the contacts 346, the impulses thereof to the signal-in relay R480 in the trunk circuit 400TC; whereby the latter relay follows as previously explained. Each time the signal-in relay R480 restores and then reoperates it interrupts and then recompletes, at the contacts 483, the previously mentioned circuit for maintaining operated the hold relay R420, thereby to cause the latter relay to remain operated during impulsing since it is of the slow-to-release type. Also, each time the signal-in relay R480 restores and then reoperates it completes and then interrupts, at the contacts 482, a circuit, including the contacts 422, for operating the dial relay R440, thereby to cause the latter relay to operate and remain operated during impulsing as it is of the slow-to-release type. Upon operating, the dial relay R440 completes, at the contacts 441, a path, including the resistor 419, in multiple with the right-hand winding of the answer relay R465, across the line conductors C521 and C522 of the incoming trunk 520, thereby to improve impulsing to the incoming selector 560. Finally, each time the signal-in relay R480 restores and reoperates it interrupts and then recompletes, at the contacts 481, the previously traced loop circuit extending by way of the line conductors C521 and C522 of the incoming trunk 520, whereby the impulses of the first digit are transmitted to the incoming selector 560 in order to cause corresponding operation thereof. More particularly, the incoming selector 560 operates in response to the first digit to select the corresponding group of connectors, including the connector 570, and then operates automatically to select an idle connector in the previously selected group. For example, the incoming selector 560 may operate to seize the trunk 571 extending to the connector 570, whereby the connector 570 is conditioned to be responsive to the second and third digits transmitted from the operator switchboard 100. At the conclusion of the first digit transmitted from the operator switchboard 100, the signal-out relay R215 in the coupling circuit 230 in the radio station 225W is retained in its operated position; thereby to cause the signal-in relay R345 in the coupling circuit 330 in the radio station 325E to be retained in its restored position; whereby the signal-in relay R480 in the trunk circuit 400TC is retained in its operated position. The operated signal-in relay R480 retains completed the previously mentioned circuit for maintaining operated the hold relay R420; and retains completed the previously traced loop circuit extending by way of the line conductors C521 and C522 of the incoming trunk 520 to the incoming selector 560. Finally, the operated signal-in relay R480 maintains interrupted, at the contacts 482, the previously traced circuit for maintaining operated the dial relay R440, whereby the latter relay restores shortly thereafter as it is of the slow-to-release type. Upon restoring, the dial relay R440 interrupts, at the contacts 441, the previously mentioned path, including the resistor 419, for short-circuiting the right-hand winding of the answer relay R465.

The second and third digits transmitted from the operator switchboard 100 over the radio link are repeated to the trunk circuit 400TC in an identical manner; whereby the second and third digits mentioned are repeated by the signal-in relay R480 in the trunk circuit 400TC over the incoming trunk 520, the incoming selector 560 and the trunk 571 to the connector 570 in order to cause corresponding operation thereof to select the subscriber line 530 extending to the called subscriber substation T in the automatic exchange 20; whereby the idle or busy condition thereof is tested in the connector 570. First assuming that the subscriber substation T is idle at this time, battery potential appears upon the control conductor C534 of the subscriber line 530 causing the connector 570 to operate in order to seize the subscriber line 530, whereby ground potential in the connector 570 is applied to the control conductor C534 of the subscriber line 530 extending to the associated line circuit 535, thereby marking the subscriber substation T as busy to the other connectors in the group, including the connector 570 having access thereto. Also, the connector 570 operates to project ringing current over the line conductors C531 and C532 of the subscriber line 530 in order to operate the ringer at the called subscriber substation T and to return ring-back tone current over the line conductors of the trunk 571 and, consequently, over the incoming selector 560, the line conductors C521 and C522 of the incoming trunk 520, and the line conductors C402 and C401 to the hybrid coil 301 in the coupling circuit 300. The ring-back tone current is passed from the hybrid coil 301 through the audio filter 303 into the primary winding of the repeating coil 304; whereby a corresponding signal induced in the secondary winding of the repeating coil 304 passes over the trunk 305 into the primary winding of the repeating coil 306 in the coupling circuit 330 in the radio station 325E. A corresponding signal is induced in the secondary winding of the repeating coil 306 and is impressed through the transmitting low pass filter 307 upon the modulating circuit of the F. M. radio transmitter 310, which is operating at this time since the start circuit for the F. M. radio transmitter 310 is closed at the contacts 351 by the operated start relay R350. Accordingly, the F. M. radio transmitter 310 modulates the 33.18 mc. radio frequency carrier in accordance with the audio ring-back tone signal mentioned.

The audio ring-back tone signal modulated 33.18 mc. radio frequency carrier is received by the F. M. radio receiver 240 in the radio station 225W; whereby the audio ring-back tone component in the output of the detector stage therein causes the squelch circuit therein to increase the sensitivity of the output circuit therein; whereby the audio ring-back tone component from the output stage in the F. M. radio receiver 240 is passed through the receiving low pass filter 261 into the primary winding of the repeating coil 262. A corresponding signal is induced in the secondary winding of the repeating coil 262 and projected over the trunk 263 into the primary winding of the repeating coil 264 in the coupling circuit 200. A corresponding audio ring-back tone signal is induced in the secondary winding of the repeating coil 264 and passes through the audio filter 265 into the hybrid coil 201 and thence is applied to the line conductors C191 and C192 and by way of the previously traced path to the operator headset 113 at the switchboard 100 in order to indicate to the operator thereat that the called subscriber substation T in the automatic exchange 20 is being rung.

Also the audio ring-back tone component in the output of the detector stage in the F. M. radio receiver 240 controls operation of the squelch circuit therein to effect operation of the start relay R250 in the coupling circuit 230 in the radio station 225W. Upon operating the start relay R250 completes, at the contacts 251, a point in multiple to the contacts 221 in the start circuit of the F. M. radio transmitter 210.

When the subscriber at the called subscriber substation T in the automatic exchange 20 answers the call, the connector 570 switches through to interrupt the projecton of ringing current over the subscriber line 530 extending to the called subscriber substation T and the return of ring-back tone current over the trunk 571 and the previously traced channel, including the radio link, to the operator headset 113 at the switchboard 100 in the manual exchange 10. Also, the connector 570 operates to bring about the reversal of polarity over the line conductors of the trunk 571 and, consequently, over the incoming selector 560 and the line conductors C521 and C522 of the incoming trunk 520, whereby the right-hand winding of the answer relay R465 in the trunk circuit 400TC is poled to operate. Upon operating, the answer relay R465 interrupts, at the contacts 466, a normally completed termination circuit, including the resistor 425, the contacts 491 and 452, and the condenser 418 extending between the line conductors C402 and C401 interconnecting the trunk circuit 400TC and the hybrid coil 301 in the coupling circuit 300 in order to prepare the channel for conversation between the operator switchboard 100 in the manual exchange 10 and the called subscriber substation T in the automatic exchange 20. Also, the answer relay R465 completes, at the contacts 467, an obvious circuit for energizing the lower winding of the supervisory relay R485, thereby to cause the latter relay to operate and complete, at the contacts 487, an obvious path for applying battery potential by way of the resistor 429 to the signal-out conductor C403 extending to the coupling circuit 300; thereby to complete a circuit including the simplex of the secondary winding of the repeating coil 304, the trunk 305 and the simplex of the primary winding of the repeating coil 306 for operating the signal-out relay R315 in the coupling circuit 330 in the radio station 325E. Upon operating the signal-out relay R315 completes, at the contacts 317, an obvious circuit for operating the hold relay R320; whereby the latter relay upon operating completes, at the contacts 321, a point in multiple to the contacts 351 in the start circuit of the F. M. radio transmitter 310. Also the signal-out relay R315 completes, at the contacts 316, the plate circuit of the transmitting amplifier 332 connected to the signal oscillator 331, producing the intermediate 4.5 kc. signal; whereby the transmitting amplifier 332 operates to impress the intermediate 4.5 kc. signal through the transmitting high pass filter 333 upon the modulating circuit of the F. M. radio transmitter 310 in order to cause the 33.18 mc. radio frequency carrier to be modulated by the intermediate 4.5 kc. signal.

The 33.18 mc. radio frequency carrier modulated by the intermediate 4.5 kc. signal is received by the F. M. radio receiver 240 in the radio station 225W; whereby the output of the detector stage therein includes the 4.5 kc. component causing the squelch circuit therein to increase the sensitivity of the output stage therein and to operate the start relay R250 in the coupling circuit 230. Upon operating the start relay R250 completes, at the contacts 251, the previously mentioned point in multiple to the contacts 221 in the start circuit of the F. M. radio transmitter 210. The 4.5 kc. component in the output stage of the F. M. radio receiver 240 passes through the receiving high pass filter 241 into the receiving amplifier 242; wherein it is amplified and supplied directly to the rectifier 243. This signal is rectified by the rectifier 243 and supplied to the D. C. amplifier 244; whereby the bias therein is increased in order to reduce the current supplied to the winding of the signal-in relay R245 sufficient to bring about restoration of the latter relay. Upon restoring the signal-in relay R245 in the coupling circuit 230 completes, at the contacts 246, a path including the simplex of the secondary winding of the repeating coil 262, the trunk 263 and the simplex of the primary winding of the repeating coil 264 for applying ground potential to the signal-in conductor C194 extending between the coupling circuit 200 and the trunk circuit 100TC. This application of ground potential to the signal-in conductor C194 completes an obvious circuit for energizing the lower winding of the signal-in relay R180 in the trunk circuit 100TC; whereupon the latter relay operates. Upon operating, the signal-in relay R180 completes, at the contacts 182, an obvious multiple circuit for illuminating the busy lamp L153; and interrupts, at the contacts 181, the previously traced circuit for energizing the upper winding of the sleeve relay R160 in multiple with the lower winding thereof and in series with the winding of the supervisory relay R130 in the cord circuit 101, whereby the sleeve relay R160 is retained in its operated position and the supervisory relay R130 restores as it is of the marginal type. Upon restoring, the supervisory relay R130 interrupts, at the contacts 131, the previously mentioned circuit for illuminating the supervisory lamp L111 in the cord circuit 101, thereby to render to the operator at the switchboard 100 answer supervision. At this time the operator at the switchboard 100 may converse with the subscriber at the called subscriber substation T in the automatic exchange 20 and with the subscriber at the calling subscriber substation in the manual exchange 10, since a three-way communication connection has now been established. Then the operator may restore the talk key K105 of the cord circuit 101, disconnecting the operator headset 113 from the cord circuit 101, whereby a connection is then completed between the calling subscribed substation in the manual exchange 10 and the called subscriber substation T in the automatic exchange 20. At this time transmitter battery is supplied, via the upper and lower windings of the supervisory relay R140, the back contacts of the ring key K106 and the tip and the ring of the plug P103, to the calling subscriber substation, whereby the supervisory relay R140 occupies its operated position maintaining interrupted at the contacts 141, a circuit for illuminating the supervisory lamp L112 in the cord circuit 101. Accordingly, the extinguished supervisory lamp L112 and the extinguished supervisory lamp L111 respectively indicate that the calling subscriber substation in the manual exchange 10 and the called subscriber substation T in the automatic exchange 20 are included in the established connection.

At this time audio frequency signals received from the calling subscriber substation in the manual exchange 10 pass through the condensers 132 and 133 in the cord circuit 101 via the plug P102 and the jack J151 into the trunk circuit 100TC, and thence over the line conductors C191 and C192 to the hybrid coil 201 in the coupling circuit 200. The audio frequency signals then pass from the hybrid coil 201, through the audio filter 203, through the repeating coil 204, over the trunk 205, and through the repeating coil 206 and the transmitting low pass filter 207 to the modulating circuit of the F. M. radio transmitter 210. Accordingly, at this time the 35.42 mc. radio frequency carrier is modulated both by the audio frequency signals and by the intermediate 4.3 kc. signal from the signal oscillator 231.

The F. M. radio receiver 340 receives the 35.42 mc. radio frequency carrier modulated both by the audio frequency signals and the intermediate 4.3 kc. signal. The 4.3 kc. component passes from the output stage of the F. M. radio receiver 340 through the receiving high pass filter 341 into the receiving amplifier 342 as previously explained; while the audio frequency signals pass from the output stage of the F. M. radio receiver 340, through the receiving low pass filter 361, and thence through the repeating coil 362 over the trunk 363, and then through the repeating coil 364 and the audio filter 365 into the hybrid coil 301 in the coupling circuit 300. The audio frequency signals then pass from the hybrid coil 301 over the line conductors C401 and C402 and, consequently, over the previously traced connection including the trunk circuit 400TC, the incoming trunk 520, the incoming selector 560, the trunk 571, the connector 570, and the subscriber line 530 to the called subscriber substation in the automatic exchange 20.

Also at this time audio frequency signals received from the called subscriber substation T in the automatic exchange 20 pass over the subscriber line 530, the connector 570, the trunk 571, the incoming selector 560 and the incoming trunk 520 to the trunk circuit 400TC and thence by way of the line conductors C401 and C402 to the hybrid coil 301 in the coupling circuit 300. The audio frequency signals then pass from the hybrid coil 301, through the audio filter 303, through the repeating coil 304, over the trunk 305, and through the repeating coil 306 and the transmitting low pass filter 307 to the modulating circuit of the F. M. radio transmitter 310. Accordingly at this time, the 33.18 mc. radio frequency carrier is modulated both by the audio frequency signals and by the intermediate 4.5 kc. signal from the signal oscillator 331.

The F. M. radio receiver 240 receives the 33.18 mc. radio frequency carrier modulated both by the audio frequency signals and the intermediate 4.5 kc. signal. The 4.5 kc. component passes from the output stage of the F. M. radio receiver 240 through the receiving high pass filter 241 into the receiving amplifier 242 as previously explained; while the audio frequency signals pass from the output stage of the F. M. radio receiver 240, through the receiving low pass filter 261, and thence through the repeating coil 262 over the trunk 263, and then through the repeating coil 264 and the audio filter 265 into the hybrid coil 201 in the coupling circuit 200. The audio frequency signals then pass from the hybrid coil 201 over the line conductors C191 and C192 and, consequently, over the previously traced connection including the trunk circuit 100TC to the calling subscriber substation in the manual exchange 10.

Now assuming that the called subscriber substation T in the automatic exchange 20 is busy when the connector 570 operates in the manner previously explained to select the subscriber line 530 extending thereto, the connector 570 operates in order to cause busy tone current to be returned over the previously traced connection including the trunk circuit 400TC to the hybrid coil 301 in the coupling circuit 300. This audio frequency signal then passes through the radio link whereby an audio frequency signal, the busy tone signal, is returned over the trunk circuit 100TC and the cord circuit 101 to the operator headset 113 at the switchboard 100, in the manner previously explained. At this time the operator at the switchboard 100 advises the subscriber at the calling subscriber substation in the manual exchange 10 that the desired connection cannot be had immediately due to the busy condition of the called subscriber substation T in the automatic exchange 20, and then proceeds to withdraw the plugs P103 and P102 of the cord circuit 101 from the associated jacks. When the plug P102 is withdrawn from the jack J151 the apparatus involved in the connection extending toward the called subscriber substation T in the automatic exchange 20 is released, in a manner more fully described hereinafter; and when the plug P103 is withdrawn from the associated jack the connection to the calling subscriber substation in the manual exchange 10 is taken down.

At the conclusion of the connection, when the subscriber at the calling subscriber substation in the manual exchange 10 replaces the receiver of the telephone instrument thereat upon its associated switchhook, the previously mentioned circuit for maintaining operated the supervisory relay R140 in the cord circuit 101 is interrupted, whereupon the latter relay restores in order to complete at the contacts 141, the previously mentioned circuit for illuminating the supervisory lamp L112 in the cord circuit 101. When the supervisory lamp L112 is thus illuminated it renders to the operator switchboard 100 disconnect supervision, whereupon the operator at the switchboard 100 withdraws the plug P103 of the cord circuit 101 from the associated jack, taking down the connection to the calling subscriber substation in the manual exchange 10.

First assuming that the subscriber at the called subscriber substation T in the automatic exchange 20 replaces the receiver of the telephone instrument thereat upon its associated switchhook before the operator at the switchboard 100 withdraws the plug P102 of the cord circuit 101 from the associated jack J151 terminating the trunk circuit 100TC, the connector 570 operates to reverse the polarity over the trunk 571, the incoming selector 560 and the incoming trunk 520 to the right-hand winding of the answer relay R465 in the trunk circuit 400TC, causing the latter relay to restore. Upon restoring, the answer relay R465 recompletes, at the contacts 466, the previously traced termination circuit, including the resistor 425 and the condenser 418, across the line conductors C402 and C401 extending to the hybrid coil 301 in the coupling circuit 300; and interrupts, at the contacts 467, the previously traced circuit for maintaining operated the supervisory relay R485; thereby to cause the latter relay to restore shortly thereafter, it being of the slow-to-release type. Upon restoring the supervisory relay R485 interrupts, at the contacts 487, the previously traced path for applying battery potential by way of the resistor 429 to the signal-out conductor C403 extending to the coupling circuit 300 in order to interrupt the previously traced circuit for maintaining operated the signal-out relay R315 in the coupling circuit 330. Upon restoring the signal-out relay R315 interrupts, at the contacts 317, the previously mentioned circuit for maintaining operated the hold relay R320; thereby to cause the latter relay to restore shortly thereafter, it being of the slow-to-release type. Upon restoring, the hold relay R320 interrupts, at the contacts 321, one of the multiple points in the start circuit of the F. M. radio transmitter 310; however without effect at this time since the start relay R350 occupies its operated position retaining completed, at the contacts 351, the start circuit of the F. M. radio transmitter 310. Further the signal-out relay R315 upon restoring interrupts, at the contacts 316, the plate circuit of the transmitting amplifier 332; thereby to remove the intermediate 4.5 kc. signal from the modulating circuit of the F. M. radio transmitter 310; whereby the F. M. radio transmitter 310 transmits the unmodulated 33.18 mc. radio frequency carrier.

The F. M. radio receiver 240 receives the unmodulated 33.18 mc. radio frequency carrier; whereby the squelch circuit therein operates to interrupt the circuit for maintaining operated the start relay R250 in order to cause the latter relay to restore shortly thereafter since it is of the slow-to-release type and to decrease the sensitivity of the output stage in the F. M. radio receiver 240. Upon restoring the start relay R250 interrupts, at the contacts 251, one of the multiple points in the start circuit of the F. M. radio transmitter 210; however without effect at this time since the operated hold relay R220 retains completed, at the contacts 221, the start circuit of the F. M. radio transmitter 210. Since the 4.5 mc. component is absent from the output stage of the F. M. radio receiver 240 at this time, the D. C. amplifier 244 is controlled in order to decrease the bias therein; whereby the winding of the signal-in relay R245 is energized sufficiently to cause the latter relay to operate. Upon operating the signal-in relay R245 in the coupling circuit 230 interrupts, at the contacts 246, the previously traced path for applying ground potential to the signal-in conductor C194 extending between the coupling circuit 200 and the trunk circuit 100TC. When the ground potential is thus removed from the signal-in conductor C194, the previously traced path for energizing the lower winding of the signal-in relay R180 in the trunk circuit 100TC is interrupted causing the latter relay to restore. Upon restoring the signal-in relay R180 interrupts at the contacts 182, the previously mentioned multiple circuit for illuminating the busy lamp L153; and recompletes, at the contacts 181, the previously traced circuit for energizing the upper winding of the sleeve relay R160 in multiple with the lower winding thereof and, consequently, in series with the winding of the supervisory relay R130 in the cord circuit 101. When this low resistance circuit is thus completed the supervisory relay R130 operates to recomplete, at the contacts 131, the previously mentioned circuit for illuminating the supervisory lamp L111, thereby to render to the operator at the switchboard 100 disconnect supervision.

Upon receiving disconnect supervision the operator at the switchboard 100 withdraws the plug P102 of the cord circuit 101 from the associated jack J151, thereby interrupting the series circuit for maintaining operated the supervisory relay R130 in the cord circuit 101 and the sleeve relay R160 in the trunk circuit 100TC. At this time the supervisory relay R130 restores, interrupting, at the contacts 131, the previously mentioned circuit for illuminating the supervisory lamp L111, whereby the cord circuit 101 is restored to its normal condition. Also, when the plug P102 is withdrawn from the jack J151, the contacts 151' thereof are operated into open circuit relation, interrupting the previously mentioned circuit for maintaining operated the jack relay R170, in order to cause the latter relay to restore shortly thereafter, it being of the slow-to-release type. Upon restoring, the sleeve relay R160 interrupts, at the contacts 161, the previously traced path for applying battery potential by way of the resistor 167 to the signal-out conductor C193 extending to the coupling circuit 200; and recompletes, at the contacts 164, the previously mentioned termination circuit, including the resistor 169, across the line conductors C191 and C192 extending to the hybrid coil 201 in the coupling circuit 200. Also, the jack relay R170 interrupts, at the contacts 173, the previously mentioned original circuit for illuminating the busy lamp L153, thereby to indicate that the trunk circuit 100TC is idle and available for use at this time.

When resistance battery potential in the trunk circuit 100TC is removed from the signal-out conductor C193, the previously traced circuit for maintaining operated the signal-out relay R215 in the coupling circuit 230 is interrupted. Upon restoring the signal-out relay R215 interrupts, at the contacts 216, the plate circuit of the transmitting amplifier 232 and interrupts, at the contacts 217, the circuit for maintaining operated the hold relay R220 in order to cause the latter relay to restore shortly thereafter since it is of the slow-to-release type. Upon restoring the hold relay R220 interrupts, at the contacts 221, the start circuit of the F. M. radio transmitter 210; whereby operation thereof is arrested at this time.

When operation of the F. M. radio transmitter 210 is arrested, the squelch circuit in the F. M. radio receiver 340 operates to decrease the sensitivity of the output stage therein and to interrupt the circuit for maintaining operated the start relay R350; whereby the latter relay restores shortly thereafter since it is of the slow-to-release type. Upon restoring the start relay R350 interrupts, at the contacts 351, the start circuit of the F. M. radio transmitter 310; whereby operation thereof is arrested. Also the absence of the 4.3 kc. component in the output stage of the F. M. radio receiver 340 controls the D. C. amplifier 344, whereby the bias therein is decreased; whereby sufficient current is supplied to the winding of the signal-in relay R345 to effect operation thereof. Upon operating the signal-in relay R345 in the coupling circuit 330 interrupts, at the contacts 346, the previously traced path for applying ground potential to the signal-in conductor C404 extending between the coupling circuit 300 and the trunk circuit 400TC. When ground potential is thus removed from the signal-in conductor C404, the previously traced circuit for maintaining operated the signal-in relay R480 in the trunk circuit 400TC is interrupted causing the latter relay to restore.

Upon restoring the signal-in relay R480 interrupts, at the contacts 481, the previously traced loop circuit extending by way of the incoming trunk 520 to the incoming selector 560, and thence by way of the trunk 571 to the connector 570; thereby to bring about the release of the connector 570. When the connector 570 is thus released ground potential therein is removed from the control conductor C534 of the subscriber line 530 extending to the line circuit 535, whereby battery potential in the line circuit 535 is applied to the control conductor C534, thereby marking the subscriber line 530 extending to the subscriber substation T as idle to the connectors in the group, including the connector 570, having access thereto. Also, when the connector 570 is released ground potential is removed from the control conductor of the trunk 571, bringing about the release of the incoming selector 560 and the consequent removal of ground potential from the control conductor C523 of the incoming trunk 520. When ground potential is removed from the control conductor C523 of the incoming trunk 520 the previously traced multiple circuits for energizing the left-hand winding of the answer relay R465 and the upper winding of the switch relay R470 are interrupted. Also, upon restoring, the signal-in relay R480 recompletes, at the contacts 482, the previously traced circuit for operating the dial relay R440; and interrupts, at the contacts 483, the previously mentioned circuit for maintaining operated the hold relay R420, whereby the latter relay restores shortly thereafter it being of the slow-to-release type.

Upon restoring, the hold relay R420 interrupts, at the contacts 422, the previously traced circuit for maintaining operated the dial relay R440, thereby to cause the latter relay to restore shortly thereafter, it being of the slow-to-release type. Further, the hold relay R420 interrupts, at the contacts 424, the previously traced circuit for energizing the lower winding of the switch relay R470, thereby to cause the latter relay to restore. Upon restoring, the switch relay R470 interrupts, at the contacts 472, 473 and 475, further points in the previously traced connection between the line conductors C402 and C401 extending to the hybrid coil 301 in the coupling circuit 300 and the line conductors C521 and C522 of the incoming trunk 520 extending to the incoming selector 560; and recompletes, at the contacts 471 and 474, the previously traced normal connections, including the contacts 497 and 499, between the line conductors C402 and C401 and the line conductors C511 and C512 of the outgoing trunk 510 accessible to the outgoing selector 550. Further, the switch relay R470 interrupts, at the contacts 478, the previously traced path for applying ground potential to the control conductor C513 of the outgoing trunk 510; and recompletes, at the contacts 477, the previously traced normal path for applying battery potential by way of the impedance 428 to the control conductor C513, thereby to mark the outgoing trunk 510 as idle to the outgoing selectors 550, etc. having access thereto. At this time the trunk circuit 400TC is completely released and available for further use.

Now assuming that the operator at the switchboard 100 withdraws the plug P102 of the cord circuit 101 from the associated jack J151 terminating the trunk circuit 100TC before the subscriber at the called subscriber substation T in the automatic exchange 20 replaces the receiver of the telephone instrument thereat upon its associated switchhook, when the plug P102 is thus withdrawn from the jack J151 the sleeve relay R160 and the jack relay R170 in the trunk circuit 100TC and the supervisory relay R130 in the cord circuit 101 all restore, as previously noted. Upon restoring, the sleeve relay R160 interrupts, at the contacts 161, the previously traced path for applying battery potential by way of the resistor 167 to the signal-out conductor C193 in order to bring about the restoration of the signal-out relay R215 and the consequent restoration of the hold relay R220 shortly thereafter in the coupling circuit 230. Upon restoring the signal-out relay R215 effectively disconnects the signal oscillator 231 from the modulating circuit of the F. M. radio transmitter 210; whereby unmodulated 35.42 mc. radio frequency carrier is transmitted therefrom.

When the F. M. radio receiver 340 receives the unmodulated 35.42 mc. radio frequency carrier, the squelch circuit therein operates to effect the restoration of the start relay R350 shortly thereafter since it is of the slow-to-release type, and to decrease the sensitivity of the output stage therein. Since the 4.3 kc. component is absent from the output stage in the F. M. radio receiver 340, the D. C. amplifier 344 is controlled to decrease the bias therein in order to supply sufficient current to the winding of the signal-in relay R345 to bring about operation thereof. Upon operating the signal-in relay R345 in the coupling circuit 330 interrupts, at the contacts 346, the previously traced path for applying ground potential to the signal-in conductor C404 extending between the coupling circuit 300 and the trunk circuit 400TC. When ground potential is thus removed from the signal-in conductor C404, the previously traced circuit for maintaining operated the signal-in relay R480 in the trunk circuit 400TC is interrupted causing the latter relay to restore.

Upon restoring the signal-in relay R480 completes, at the contacts 482, a circuit including the contacts 476 and 486 for energizing the upper winding of the supervisory relay R485 and interrupts, at the contacts 481, the previously traced loop circuit extending between the right-hand of the answer relay R465 and the connector 570 in order to bring about the release of the connector 570 and the incoming selector 560, in the manner previously explained. When the connector 570 is thus released in the event the subscriber at the called subscriber substation T has not replaced the receiver of the telephone instrument upon its associated switchhook at this time, the line circuit 535 individual to the subscriber line 530 operates in order to lock the subscriber line 530 out of service and to mark it as busy to the connectors in the group, including the connector 570, having access thereto.

When the incoming selector 560 is thus released ground potential is removed from the control conductor C523 of the incoming trunk 520, thereby to interrupt the previously traced multiple circuits for energizing the left-hand winding of the answer relay R465 and the upper winding of the switch relay R470. At this time the answer relay R465 restores, interrupting, at the contacts 467, the previously mentioned circuit for energizing the lower winding of the supervisory relay R485; however, the latter relay is maintained in its operated position at this time, due to the completed circuit for energizing the upper winding thereof. Further, upon restoring, the signal-in relay R480 interrupts, at the contacts 483, the previously mentioned circuit for maintaining operated the hold relay R420, thereby to cause the latter relay to restore shortly thereafter, it being of the slow-to-release type. Finally, the signal-in relay R480, upon restoring, completes, at the contacts 482, the previously traced circuit for operating the dial relay R440. Upon restoring, the hold relay R420 brings about the restoration of the dial relay R440 shortly thereafter, as previously noted, and interrupts, at the contacts 424, the previously traced circuit for energizing the lower winding of the switch relay R470 in order to cause the latter relay to restore. Upon restoring, the switch relay R470 interrupts, at the contacts 476, the previously traced circuit for energizing the upper winding of the supervisory relay R485, thereby to cause the latter relay to restore shortly thereafter, it being of the slow-to-release type. Upon restoring, the supervisory relay R485 interrupts, at the contacts 487, the previously traced path for applying battery potential by way of the resistor 429 to the signal-out conductor C403 extending to the coupling circuit 300 in order to interrupt the previously traced circuit for maintaining operated the signal-out relay R315 in the coupling circuit 330. Upon restoring the signal-out relay R315 interrupts, at the contacts 317, the previously traced circuit for maintaining operated the hold relay R320 in order to cause the latter relay to restore shortly thereafter since it is of the slow-to-release type. Also upon restoring the signal-out relay R315 interrupts, at the contacts 316, the plate circuit of the transmitting amplifier 332. Upon restoring the hold relay R320 interrupts, at the contacts 321, the start circuit of the F. M. radio transmitter 310 since the start relay R350 already occupies its restored position; whereby operation of the F. M. radio transmitter 310 is arrested.

When operation of the F. M. radio transmitter 310 is arrested, the squelch circuit in the F. M. radio receiver 240 operates in order to interrupt the previously mentioned circuit for maintaining operated the start relay R250 in order to cause the latter relay to restore shortly thereafter since it is of the slow-to-release type and also to decrease the sensitivity of the output stage in the F. M. radio receiver 240. Upon restoring the start relay R250 interrupts, at the contacts 251, the start circuit of the F. M. radio transmitter 210 since the hold relay R220 is restored at this time. The absence of the 4.5 kc. signal in the output stage of the F. M. radio receiver 240 controls the D. C. amplifier 244; whereby the bias therein is decreased in order to cause the current supplied to the winding of the signal-in relay R245 to be increased sufficiently to bring about operation thereof. Upon operating the signal-in relay R245 interrupts, at the contacts 246, the previously mentioned path for applying ground potential to the signal-in conductor C194 extending between the coupling circuit 200 and the trunk circuit 100TC. When ground potential is thus removed from the signal-in conductor C194, the previously traced circuit for energizing the lower winding of the signal-in relay R180 in the trunk circuit 100TC is interrupted, causing the latter relay to restore. Upon restoring, the signal-in relay R180 interrupts, at the contacts 182, the previously mentioned alternative circuit for illuminating the busy lamp L153, in order to extinguish the busy lamp L153, thereby to indicate that the trunk circuit 100TC is idle and available for further use at this time.

Reconsidering the established connection between the calling subscriber substation in the manual exchange 10 and the called subscriber substation T in the automatic exchange 20, it is noted that the subscriber at the called subscriber substation T in the automatic exchange 20 may render flashing switchhook supervision to the operator at the switchboard 100 in the manual exchange 10 by repeatedly operating the associated switchhook at the called subscriber substation T. Each time the switchhook at the called subscriber substation T is operated and restored, the connector 570 operates to reverse and then to restore the polarity over the trunk 571, the incoming selector 560 and the incoming trunk 520 to the right-hand winding of the answer relay R465 in the trunk circuit 400TC, causing the latter relay to restore and then reoperate. Each time the answer relay R465 restores and then reoperates, it interrupts and then recompletes, at the contacts 467, the previously mentioned circuit for energizing the lower winding of the supervisory relay R485; whereby the latter relay follows shortly thereafter the answer relay R465 provided the switchhook at the called subscriber substation T is operated at a proper speed; the supervisory relay R485 being of the slow-to-release type. Each time the supervisory relay R485 restores and then reoperates, it interrupts and then recompletes at the contacts 487, the previously traced circuit for maintaining operated the signal-out relay R315 in the coupling circuit 330; whereby the latter relay follows. Each time the signal-out relay R315 restores and then reoperates, it interrupts and then recompletes, at the contacts 317, the previously mentioned circuit for maintaining operated the hold relay R320; however without effect since the latter relay being of the slow-to-release type remains operated during impulsing. Also each time the signal-out relay R315 restores and then reoperates, it interrupts and then recompletes, at the contacts 316, the plate circuit of the transmitting amplifier 332; whereby the signal oscillator 331 is effectively disconnected and then reconnected to the modulating circuit of the F. M. radio transmitter 310; whereby pulses of unmodulated 33.13 mc. radio frequency carrier are received by the F. M. radio receiver 240; whereby corresponding pulses are transmitted to the start relay R250; however without effect since the latter relay, being of the slow-to-release type, remains operated during impulsing. Also the pulses are transmitted from the output stage of the F. M. radio receiver 240 through the receiving high pass filter 241 into the receiving amplifier 242 in order to cause the signal-in relay R245 to follow in an obvious manner. Each time the signal-in relay R245 operates and then restores, it interrupts and the recompletes, at the contacts 246, the previously traced circuit for energizing the lower winding of the signal-in relay R180 in the trunk circuit 100TC; whereby the latter relay follows. Each time the signal-in relay R180 restores and then reoperates, it completes and then interrupts, at the contacts 181, the previously traced circuit for energizing the upper winding of the sleeve relay R160 in multiple with the lower winding thereof and, consequently, in series with the winding of the supervisory relay R130 in the cord circuit 101; whereby the supervisory relay R130, being of the marginal type, follows. Each time the supervisory relay R130 operates and then restores, it completes and then interrupts, at the contacts 131, the previously mentioned circuit for illuminating the supervisory lamp L111; whereby the latter lamp is flashed rendering to the operator at the switchboard 100 recall supervision from the called subscriber substation T in the automatic exchange 20.

Considering now the extension of a connection between the automatic exchange 20 and the manual exchange 10, and assuming that a call is initiated at the calling subscriber substation T in the automatic exchange 20, the line circuit 535 individual to the subscriber line 530 extending to the calling subscriber substation T operates in order to place battery potential upon the control conductor C533 of the subscriber line 530 and ground potential upon the start conductor C536 extending to the distributor 540 associated with the group of finder-selector links, including the link illustrated, and comprising the finder 542 and the selector 541. The distributor 540 assigns an idle one of the finder-selector links mentioned, such, for example, as that illustrated, and initiates operation of the finder 542 thereof, whereby the finder 542 operates to seize the subscriber line 530 extending to the calling subscriber substation T bringing about further operation of the line circuit 535, whereupon ground potential is placed upon the control conductor C534 of the subscriber line 530 in order to mark the subscriber line 530 as busy to the connectors in the group, including the connector 570, having access thereto. Also, the line circuit 535 releases the distributor 540 and the selector 541 is conditioned to be responsive to the first digit dialed at the calling subscriber substation T. Furthermore, it is noted that the calling subscriber substation T is included in a ten line group rendered a particular class of service, whereby the set of switch springs S544 in the finder 542 is actuated into engagement incident to operation of the finder 542 to seize the subscriber line 530 extending to the calling subscriber substation T. When the set of switch springs S544 is thus actuated the class tone conductor C546, to which a class tone indicative of the class of the calling subscriber substation T is subsequently impressed, is connected by way of the condenser 545 to the set of switch springs S543 in the selector 541; which set of switch springs S543 is operated further to connect the tone conductor C546 to the control conductor of a seized trunk, only in the event of the selector 541 is operated in accordance with a predetermined first digit indicative of a trunk call. Thus, it will be understood that when the selector 541 is operated to seize the trunk 571 extending to the connector 570 when a local call is extended by way of the finder-selector link illustrated that the set of switch springs S543 is not operated to connect the class tone conductor C546 to the control conductor of the trunk 571 extending to the connector 570, since such operation would be of no utility in conjunction with the extension of a local call from the calling subscriber substation T.

However, continuing with the extension of the present call from the calling subscriber substation T when the subscriber thereat dials the first digit into the selector 541, the selector 541 operates in order to select first the corresponding group of trunks and then an idle trunk therein. For example, the selector 541 may operate to select the particular trunk 551 extending to the outgoing selector 550 in response to the first digit dialed therein, whereby the loop circuit from the calling subscriber substation T is extended into the outgoing selector 550. Also, since this is a trunk call the set of switch springs S543 in the selector 541 is actuated into engagement, thereby to extend the class tone conductor C546 over the control conductor of the trunk 551 to the control conductor of the outgoing selector 550. The outgoing selector 550 then responds to the second digit dialed at the calling subscriber substation T, selecting first the corresponding group of outgoing trunks and then an idle outgoing trunk therein. For example, the outgoing selector 550 may select the outgoing trunk 510 extending to the trunk circuit 400TC, whereby there is completed a loop circuit extending from the calling subscriber substation T to the line relay R490 in the trunk circuit 400TC; and the control conductor of the outgoing selector 550 is connected to the control conductor C513 of the outgoing trunk 510, for a purpose more fully explained hereinafter. In passing, it is noted that the outgoing trunk 510 is marked as idle to the outgoing selector 550 by the application of battery potential thereon over the previously traced path, including the contacts 413 and 477 and the impedance 428.

The loop circuit mentioned extends from ground by way of the lower winding of the line relay R490 and the contacts 499 to the line conductor C512 of the outgoing trunk 510, and from battery by way of the upper winding of the line relay R490 and the contacts 497 to the line conductor C511 of the outgoing trunk 510; and thence by way of the outgoing selector 550, the trunk 551, the selector 541, the finder 542 and the subscriber line 530 to the calling subscriber substation T. When this loop circuit is thus completed the line relay R490 operates to complete, at the contacts 492, a path for applying battery potential by way of the resistor 429 to the signal-out conductor C403 extending into the coupling circuit 300. Also, the line relay R490 interrupts, at the contacts 491, the previously traced termination circuit, including the resistor 425 and the condenser 418, across the line conductors C402 and C401 extending between the trunk circuit 400TC and the hybrid coil 301 in the coupling circuit 300. Further, the line relay R490 completes, at the contacts 493, an obvious circuit for operating the hold relay R410. Upon operating, the hold relay R410 completes, at the contacts 411, a path, including the contacts 421, the condenser 408, the contacts 442 and 452 and the condenser 418, for connecting the interrupted generator conductor C406 to the line conductor C402; and completes, at the contacts 412, a path, including the contacts 431, 443 and 454, for connecting ground potential to the line conductor C401; the line conductors C402 and C401 being connected by the contacts 471, 474 and 497, 499 to the line conductors C511 and C512 of the outgoing trunk 510, whereby ring-back tone current is returned over the previously traced loop circuit to the calling subscriber substation T in order to indicate to the subscriber thereat that the operator at the switchboard 100 in the manual exchange 10 is being rung. Also, the hold relay R410 completes, at the contacts 417, a path, including the contacts 436, for applying ground potential to the ringing machine start conductor C405 in order to initiate operation of the ringing machine. Further, the hold relay R410 interrupts, at the contacts 413, the previously traced path for applying battery potential by way of the impedance 428 to the control conductor C513 of the outgoing trunk 510; and completes, at the contacts 414, a path for applying ground potential by way of the lower winding of the tone relay R460 to the control conductor C513 of the outgoing trunk 510. When the above-traced path is completed the lower winding of the tone relay R460 is energized, causing the latter relay to operate and complete, at the contacts 461, an obvious path for applying ground potential to the tone start conductor C407, thereby to initiate operation of the tone generator, not shown, in order to cause a tone voltage to be applied to the class tone conductor C546 associated with the finder 542. Also, ground potential applied by way of the lower winding of the tone relay R460 to the control conductor C513 of the outgoing trunk 510 marks the outgoing trunk 510 as busy to the other outgoing selectors in the group, including the outgoing selector 550, having access thereto.

The application of resistance battery potential to the signal-out conductor C403 completes the previously traced circuit for operating the signal-out relay R315 in the coupling circuit 330. Upon operating the signal-out relay R315 completes, at the contacts 317, the previously mentioned circuit for operating the hold relay R320; whereby the latter relay upon operating completes, at the contacts 321, the previously mentioned start circuit of the F. M. radio transmitter 310 in order to initiate operation thereof. Also the signal-out relay R315 completes, at the contacts 316, the previously mentioned plate circuit of the transmitting amplifier 332; thereby effectively to connect the signal oscillator 331 to the modulating circuit of the F. M. radio transmitter 310. Accordingly, at this time the F. M. radio transmitter 310 transmits the 33.18 mc. radio frequency carrier modulated by the intermediate 4.5 kc. signal.

The F. M. radio receiver 240 receives the 33.18 mc. radio frequency carrier modulated by the intermediate 4.5 kc. signal; whereby the squelch circuit therein increases the sensitivity of the output stage therein and effects operation of the start relay R250. Upon operating the start relay R250 completes, at the contacts 251, the previously mentioned start circuit of the F. M. radio transmitter 210 thereby to initiate operation thereof to transmit the unmodulated 35.42 mc. radio frequency carrier. The unmodulated 35.42 mc. radio frequency carrier is received by the F. M. radio receiver 340; however without effect at this time since the 4.3 kc. component is absent from the output of the detector stage therein. The 4.5 kc. component is present in the output stage of the F. M. radio receiver 240 and is passed through the receiving high pass filter 241 into the receiving amplifier 242; whereupon this amplified component is passed directly to the rectifier 243; whereby the rectified signal is passed to the D. C. amplifier 244 in order to increase the bias therein so that the current supplied to the winding of the signal-in relay R245 is sufficiently reduced to cause the latter relay to restore. Upon restoring the signal-in relay R245 in the coupling circuit 230 completes, at the contacts 246, the previously traced circuit for energizing the lower winding of the signal-in relay R180 in the trunk circuit 100TC in order to cause the latter relay to operate. Upon operating the signal-in relay R180 completes, at the contacts 182, the previously mentioned path for illuminating the busy lamp L153 and an obvious multiple path, including the contacts 174, for illuminating the line lamp L152. The illumination of the busy lamp L153 indicates that the trunk circuit 100TC is busy at this time, while the illumination of the line lamp L152 indicates that a call is waiting to be answered on the trunk circuit 100TC at this time. When the operator at the switch board 100 observes the illuminated line lamp L152 she selects an idle cord, such, for example, as the cord 101, operates the talk key K105 thereof, and inserts the plug P102 thereof into the jack J151 terminating the trunk circuit 100TC. When the plug P102 is thus inserted into the jack J151 the contacts 151' of the jack J151 are actuated into engagement, effecting operation of the jack relay R170, in the manner previously explained. Also, at this time the previously traced circuit for energizing the winding of the supervisory relay R130 in series with the lower winding of the sleeve relay R160 is completed, whereby the sleeve relay R160 operates. However, the supervisory relay R130 does not operate as it is of the marginal type, as previously noted. Upon operating, the jack relay R170 interrupts, at the contacts 174, the previously traced circuit for illuminating the line lamp L152 in order to indicate that the call on the trunk circuit 100TC has been answered; and completes, at the contacts 173, the previously mentioned multiple circuit for illuminating the busy lamp L152. Also upon operating the jack relay R170 completes, at the contacts 171, the previously traced path for applying battery potential by way of the resistor 167 to the signal-out conductor C193 in order to complete the previously traced circuit for operating the signal-out relay R215 in the coupling circuit 230. Upon operating the signal-out relay R215 completes, at the contacts 217, the previously traced circuit for operating the hold relay R220; whereupon the latter relay completes, upon operating, at the contacts 221, the multiple point in the start circuit of the F. M. radio transmitter 210. Also the signal-out relay R215 completes, at the contacts 216, the plate circuit of the transmitting amplifier 232; thereby effectively to connect the signal oscillator 231 to the modulating circuit of the F. M. radio transmitter 210.

Accordingly, at this time the F. M. radio transmitter 210 transmits the 35.42 mc. radio frequency carrier modulated by the intermediate 4.3 kc. signal.

The 35.42 mc. radio frequency carrier modulated by the intermediate 4.3 kc. signal is received by the F. M. radio receiver 340; whereby the squelch circuit therein operates to increase the sensitivity of the output stage therein and to effect operation of the start relay R350 in the coupling circuit 330. Upon operating the start relay R350 completes, at the contacts 351, the multiple point in the start circuit of the F. M. radio transmitter 310. The 4.3 kc. component in the output stage of the F. M. radio receiver 340 is passed through the receiving high pass filter 341 into the receiving amplifier 342; whereby the amplified 4.3 kc. component is passed directly into the rectifier 343 to produce a rectified signal that is passed into the D. C. amplifier 344 in order to increase the bias therein; whereby the current supplied to the winding of the signal-in relay R345 is reduced sufficiently to cause the latter relay to restore. Upon restoring the signal-in relay R345 in the coupling circuit 330 completes, at the contacts 346, the previously traced path for applying ground potential to the signal-in conductor C404; thereby to complete the previously traced circuit for energizing the winding of the signal-in relay R480 in the trunk circuit 400TC; whereby the latter relay operates. Upon operating, the signal-in relay R480 completes, at the contacts 483, the previously mentioned circuit for operating the hold relay R420. Upon operating, the hold relay R420 interrupts, at the contacts 421, the previously traced path for connecting the interrupted generator conductor C406 to the line conductor C402, thereby to interrupt the return of ring-back tone current to the calling subscriber substation T in the automatic exchange 20 and to prevent the transmission of this ring-back tone current into the hybrid coil 301 in the coupling circuit 300 and the consequent transmission of this signal over the radio link. Also, the hold relay R420 completes, at the contacts 423, a circuit, including the contacts 415 and 434, for operating the timer relay R450. Upon operating, the timer relay R450 completes, at the contacts 453 and 455, a bridge connection including the condenser 418 for connecting the upper winding of the tone relay R460 across the line conductors C401 and C402. Accordingly, at this time, class tone from the conductor C546 is fed forwardly by way of the set of switch springs S544 in the finder 542, the condenser 545, the set of switch springs S543 in the selector 541, the control conductor of the trunk 551, the outgoing selector 550, the control conductor C513 of the outgoing trunk 510, the contacts 414, and the lower winding of the tone relay R460, to ground. The class tone current traversing the lower winding of the tone relay R460 causes a corresponding class tone voltage to be induced in the upper winding thereof and impressed across the line conductors C401 and C402 and, consequently, supplied to the hybrid coil 301 in the coupling circuit 300.

The class tone signal supplied to the hybrid coil 301 is supplied by way of the audio filter 303, the repeating coil 304, the trunk 305, the repeating coil 306 and the transmitting low pass filter 307 to the modulating circuit of the F. M. radio transmitter 310; whereby the 33.18 mc. radio frequency carrier is modulated in accordance with the audio class tone signal. The 33.18 mc. radio frequency carrier modulated by the audio class tone signal is received by the F. M. radio receiver 240; whereby audio class tone signal appears in the output stage therein and is supplied by way of the receiving low pass filter 261, the repeating coil 262, the trunk 263, the repeating coil 264, and the audio filter 265 to the hybrid coil 201 in the coupling circuit 200 wherein it is impressed across the line conductors C191 and C192 extending into the trunk circuit 100TC. At this time the line conductors C191 and C192 are connected by way of the contacts 162 and 165 to the tip and the ring of the jack J151 and therefrom by way of the tip and the ring of the plug P102, and the condensers 132 and 133, and the contacts of the talk key K105 to the headset 113 at the operator switchboard 100. Accordingly, the operator at the switchboard 100 receives the class tone signal indicative of the class of the calling subscriber substation T in the automatic exchange 20.

Also, upon operating, the timer relay R450 sets into vibration its armature RA451, whereby the contacts 456 are completed and interrupted periodically, completing and interrupting periodically an obvious circuit for energizing the winding of the timer relay R430, which latter relay being of the slow-to-operate type does not operate immediately. Shortly thereafter when the vibratory armature RA451 of the timer relay R450 settles down, the circuit for energizing the winding of the timer relay R430 is completed, steadily causing the latter slow-to-operate relay to operate. Upon operating, the timer relay R430 completes, at the contacts 433, a holding circuit therefor, including the contacts 415 and 423. Also, the timer relay R430 interrupts, at the contacts 434, the previously traced circuit for operating the timer relay R450 in order to cause the latter relay to restore. Upon restoring, the timer relay R450 interrupts, at the contacts 453 and 455, the previously traced connection between the upper winding of the tone relay R460 and the line conductors C401 and C402, thereby to remove the application of the class tone signal therefrom and, consequently, to arrest the transmission thereof over the radio link; whereby the class tone signal is removed from the headset 113 at the switchboard 100 in the manual exchange 10. Also, upon operating, the timer relay R430 interrupts, at the contacts 436, the previously mentioned path, including the contacts 417, for applying ground potential to the ringing machine start conductor C405; and completes, at the contacts 435, a holding circuit, including the contacts 417, for maintaining operated the hold relay R410. Further, the timer relay R430 completes, at the contacts 432, a circuit, including the contacts 483, for operating the reverse battery relay R495. Upon operating, the reverse battery relay R495 reverses, at the contacts 496, 497, 498 and 499, the polarity of the outgoing trunk 510 with respect to the line relay R490, which reversal of polarity over the outgoing trunk 510 may be utilized in the finder-selector link illustrated and included in the loop circuit extending to the calling subscriber substation T for metering purposes.

In view of the above description, it will be understood that the trunk circuit 400TC operates in order to cause a splash of class tone signal to be returned to the headset 113 at the operator switchboard 100 in the manual exchange 10 and, in the event the operator thereat fails to recognize the class tone signal, she may cause the same to be re-transmitted by momentarily disconnecting the cord circuit 101 from the trunk circuit 100TC. More particularly, the plug P102 of the cord circuit 101 is withdrawn from the jack J151 terminating the trunk circuit 100TC, permitting the jack relay R170 and the sleeve relay R160 in the trunk circuit 100TC to restore. Upon restoring the sleeve relay R160 brings about the restoration of the signal-out relay R215 in the coupling circuit 230 and the consequent reoperation of the signal-in relay R345 in the coupling circuit 330 and the consequent restoration of the signal-in relay R480 in the trunk circuit 400TC. Shortly following the restoration of the signal-in relay R480, the hold relay R420 restores since it is of the slow-to-release type. Upon restoring the hold relay R420 interrupts, at the contacts 423, the previously traced holding circuit for maintaining operated the timer relay R430; whereby the latter relay restores effecting the restoration of the reverse battery relay R495. Thereafter, when the plug P102 of the cord circuit 101 is again inserted into the jack J151, the jack relay R170 and the sleeve relay R160 reoperate in the trunk circuit 100TC effecting reoperation of the signal-out relay R215 in the coupling circuit 230 and the consequent restoration of the signal-in relay R345 in the coupling circuit 330 and the consequent reoperation of the signal-in relay R480 in the trunk circuit 400TC. Upon reoperating the signal-in relay R480 effects reoperation of the hold relay R420 followed by the reoperation of the timer relay R450 and then reoperation of the timer relay R430 and then reoperation of the reverse battery relay R495. During the time interval that the timer relay R450 is operated, before operation of the timer relay R430, as explained above, the class tone signal is again returned from the trunk circuit 400TC over the radio link and the trunk circuit 100TC to the operator switchboard 100. At this time a connection has been completed from the calling subscriber substation T in the automatic exchange 20 to the operator switchboard 100 in the manual exchange 10.

The transmission of audio frequency signals between the operator switchboard 100 and the hybrid coil 201 in the coupling circuit 200 is the same as that previously explained; while the transmission of audio frequency signals between the calling subscriber substation T and the hybrid coil 301 in the coupling circuit 300 by way of the trunk circuit 400TC, the outgoing trunk 510, the outgoing selector 550, the trunk 551, the selector 541, the finder 542 and the subscriber line 530 is substantially identical to that previously explained. The transmission of audio signals from the hybrid coil 201 in the coupling circuit 200 to the F. M. radio transmitter 210, as well as the transmission of audio signals from the F. M. radio receiver 240 to the hybrid coil 201 is the same as previously explained. Finally, the transmission of audio signals from the hybrid coil 301 in the coupling circuit 300 to the F. M. radio transmitter 310, as well as the transmission of audio signals from the F. M. radio receiver 340 to the hybrid coil 301, is the same as previously explained.

The operator at the switchboard 100 communicates with the subscriber at the calling subscriber substation T and learns the destination of the call, whereupon she inserts the plug P103 of the cord circuit 101 into the jack terminating the subscriber line extending to the called subscriber substation, and then operates the ring key K106 in the cord circuit 101, causing ringing current to be projected from the interrupted generator 107 over the line conductors of the subscriber line to the called subscriber substation. When the subscriber at the called subscriber substation in the manual exchange 10 answers the call by removing the receiver of the telephone instrument thereat from its associated switchhook, an obvious circuit is completed for energizing in series the upper and lower windings of the supervisory relay R140, assuming that the ring key K106 occupies its restored position at this time, the ring key K106 being operated intermittently in the manner noted. When the upper and lower windings of the supervisory relay R140 are thus energized, the latter relay operates to interrupt, at the contacts 141, a previously completed circuit for illuminating the supervisory lamp L112, thereby rendering to the operator at the switchboard 100 answer supervision. The operator at the switchboard 100 then restores the talk key K105, whereby there is completed at this time a connection between the calling subscriber substation T in the automatic exchange 20 and the called subscriber substation in the manual exchange 10.

At the conclusion of the connection, when the subscriber at the called subscriber substation in the manual exchange 10 replaces the receiver of the telephone instrument thereat upon its associated switchhook, the previously mentioned circuit for maintaining operated the supervisory relay R140 in the cord circuit 101 is interrupted, whereupon the latter relay restores in order to complete, at the contacts 141, the previously mentioned circuit for illuminating the supervisory lamp L112 in the cord circuit 101. When the supervisory lamp L112 is thus illuminated it renders to the operator switchboard 100 disconnect supervision, whereupon the operator at the switchboard 100 withdraws the plug P103 of the cord circuit 101 from the associated jack, taking down the connection to the called subscriber substation in the manual exchange 10.

Now assuming that the subscriber at the calling subscriber substation T in the automatic exchange 20 replaces the receiver of the telephone instrument thereat upon its associated switchhook before the operator at the switchboard 100 withdraws the plug P102 of the cord circuit 101 from the associated jack J151 terminating the trunk circuit 100TC, the loop circuit extending between the calling subscriber substation T and the line relay R490 in the trunk circuit 400TC is interrupted, causing the latter relay to restore. Upon restoring, the line relay R490 recompletes, at the contacts 491, the previously traced termination circuit, including the resistor 425 and the condenser 418 across the line conductors C401 and C402 extending between the trunk circuit 400TC and the hybrid coil 301 in the coupling circuit 300. Also the line relay R490 interrupts, at the contacts 492, the previously traced path for applying battery potential by way of the resistor 429 to the signal-out conductor C403, thereby to bring about the restoration of the signal-out relay R315 in the coupling circuit 330 and the consequent restoration of the hold relay R320 shortly thereafter, the latter relay being of the slow-to-release type. The signal-in relay R245 in the coupling circuit 230 then reoperates in order to interrupt, at the contacts 246, the previously traced path for applying ground potential to the signal-in conductor C194 in order to bring about the restoration of the signal-in relay R180 in the trunk circuit 100TC. Upon restoring, the signal-in relay R180 completes, at the contacts 181, the previously traced low resistance circuit for energizing the upper winding of the sleeve relay R160 in the trunk circuit 100TC in series with the winding of the supervisory relay R130 in the cord circuit 101, causing the latter relay to operate in order to illuminate the supervisory lamp L111 in the cord circuit 101. The illumination of the supervisory lamp L111 in the cord circuit 101 gives disconnect supervision to the operator switchboard 100, whereby the operator thereat withdraws the plug P102 effecting the restoration of the sleeve relay R160 and the jack relay R170 in the trunk circuit 100TC and the restoration of the supervisory relay R130 in the cord circuit 101, in the manner previously explained. When the trunk circuit 100TC is thus released the signal-out relay R215 in the coupling circuit 230 restores effecting the release of the hold relay R220 shortly thereafter since the latter relay is of the slow-to-release type. Upon restoring the hold relay R220 interrupts, at the contacts 221, the start circuit of the F. M. radio transmitter 210 in order to arrest operation thereof. Shortly thereafter, the start relay R350 in the coupling circuit 330 restores since it is of the slow-to-release type to interrupt, at the contacts 351, the previously mentioned start circuit of the F. M. radio transmitter 310 in order to arrest operation thereof. Also the signal-in-relay R345 in the coupling circuit 330 reoperates to effect restoration of the signal-in relay R480 in the trunk circuit 400TC in the manner previously explained. Upon restoring, the signal-in relay R480 interrupts, at the contacts 483, the previously traced multiple circuits for maintaining operated the hold relay R420 and the reverse battery relay R495; whereby the reverse battery relay R495 restores immediately and the hold relay R420 restores shortly thereafter it being of the slow-to-release type. Upon restoring, the reverse battery relay R495 restores, at the contacts 496, 497, 498, and 499, the normal polarity of the outgoing trunk 510 with respect to the line relay R490 in the trunk circuit 100TC. Also, upon restoring, the signal-in relay R480 effects operation of the dial relay R440; and upon restoring, the hold relay R420 effects the restoration of the dial relay R440, in the manner previously explained. Also, upon restoring, the hold relay R420 interrupts, at the contacts 423, the circuit for maintaining operated the timer relay R430; and, upon restoring, the timer relay R430 interrupts, at the contacts 435, the previously traced holding circuit for maintaining operated the hold relay R410, whereby the latter relay restores shortly thereafter, it being of the slow-to-release type. Upon restoring, the hold relay R410 interrupts, at the contacts 414, the previously traced circuit for maintaining operated the tone relay R460; and recompletes, at the contacts 413, the previously traced path for applying battery potential by way of the impedance 428 to the control conductor C513 of the outgoing trunk 510. When ground potential is removed from the control conductor C513 of the outgoing trunk 510, the outgoing selector 550, the selector 541 and the finder 542 are released; and the application of battery potential to the control conductor C513 marks the outgoing trunk 510 as idle to the outgoing selectors in the group, including the outgoing selector 550, having access thereto. When the selector 541 is thus released the set of switch springs S543 is actuated into open circuit position, and when the finder 542 is thus released the set of switch springs S544 is actuated into open circuit position. Also, when the finder 542 is thus released ground potential is removed from the control conductor C533 of the subscriber line 530, causing operation of the line circuit 535 to apply battery potential to the control conductor C534 thereof, whereby the subscriber line 530 extending to the subscriber substation T is marked as idle to the connectors in the group, including the connector 570, having access thereto.

Now assuming that the operator at the switchboard 100 withdraws the plug P102 of the cord circuit 101 from the associated jack J151 terminating the trunk circuit 100TC before the subscriber at the calling subscriber substation T in the automatic exchange 20 replaces the receiver of the telephone instrument thereat upon its associated switchhook, when the plug P102 is thus withdrawn from the jack J151 the sleeve relay R160 and the jack relay R170 in the trunk circuit 100TC restore, in the manner previously exlpained. Upon restoring, the sleeve relay R160 interrupts, at the contacts 161, the previously traced path for applying battery potential by way of the resistor 167 to the signal-out conductor C193, in order to bring about the restoration of the signal-out relay R215 in the coupling circuit 230 and the consequent restoration of the hold relay R220 shortly thereafter, since the latter relay is of the slow-to-release type. The start relay R350 in the coupling circuit 300 restores shortly thereafter since it is of the slow-to-release type and the signal-in relay R345 reoperates in order to effect the restoration of the signal-in relay R480 in the trunk circuit 400TC as previously explained. Upon restoring the signal-in relay R480 effects the operation of the dial relay R440 and the restoration of the hold relay R420 and the reverse battery relay R495 as previously noted. Upon restoring the hold relay R420 effects the restoration of the dial relay R440 and the timer relay R430, as previously noted. Upon restoring, the reverse battery relay R495 effects the reversal of polarity over the outgoing trunk 510.

Subsequently, when the subscriber at the calling subscriber substation T replaces the receiver of the telephone instrument thereat upon its associated switchhook, the loop circuit extending to the line relay R490 in the trunk circuit 400TC is interrupted, causing the latter relay to restore. Upon restoring, the line relay R490 interrupts, at the contacts 493, the previously traced circuit for maintaining operated the hold relay R410, in order to cause the latter relay to restore shortly thereafter it being of the slow-to-release type. Upon restoring, the hold relay R410 effects the restoration of the tone relay R460 and the release of the outgoing selector 550, the selector 541 and the finder 542, all in the manner previously explained. Further, upon restoring, the line relay R490 interrupts, at the contacts 492, the previously traced path for applying battery potential by way of the resistor 429 to the signal-out conductor C403, thereby to effect the restoration of the signal-out relay R315 in the coupling circuit 330 and the consequent restoration of the hold relay R320 shortly thereafter since the latter relay is of the slow-to-release type. Upon restoring the hold relay R320 interrupts, at the contacts 321, the start circuit of the F. M. radio transmitter 310 in order to arrest operation thereof. Shortly thereafter, the start relay R250 in the coupling circuit 230 restores, since it is of the slow-to-release type to interrupt, at the contacts 251, the start circuit of the F. M. radio ransmitter 210 in order to arrest operation thereof. Also, the signal-in relay R245 in the coupling circuit 230 operates in order to interrupt, at the contacts 246, the previously traced circuit for maintaining operated the signal-in relay R180 in the trunk circuit 100TC in the manner previously explained. At this time all of the equipment employed in the established connection between the calling subscriber substation T in the automatic exchange 20 and the called subscriber substation in the manual exchange 10 is completely released and available for further use.

Reconsidering the established connection between the calling subscriber substation T in the automatic exchange 20 and the called subscriber substation in the manual exchange 10, it is noted that the subscriber at the calling subscriber substation T in the automatic exchange 20 may render flashing switchhook supervision to the operator at the switchboard 100 in the manual exchange 10 by repeatedly operating the associated switchhook at the calling subscriber substation T. Each time the switchhook at the called subscriber substation T is operated and restored, the previously traced loop circuit extending to the line relay R490 in the trunk circuit 400TC is interrupted and then recompleted in order to cause the latter relay to follow. Each time the line relay R490 restores and then reoperates, it interrupts and then recompletes, at the contacts 492, the previously traced circuit for maintaining operated the signal-out relay R315 in the coupling circuit 330; whereby the latter relay follows. Each time the signal-out relay R315 restores and then reoperates, it interrupts and then recompletes, at the contacts 317, the previously mentioned circuit for maintaining operated the hold relay R320; however without effect since the latter relay being of the slow-to-release type remains operated during impulsing. Also each time the signal-out relay R315 restores and then reoperates, it interrupts and then recompletes, at the contacts 316, the plate circuit of the transmitting amplifier 332; whereby the signal oscillator 331 is effectively disconnected and then reconnected to the modulating circuit of the F. M. radio transmitter 310; whereby pulses of unmodulated 33.18 mc. radio frequency carrier are received by the F. M. radio receiver 240; whereby corresponding pulses are transmitted to the start relay R250; however without effect since the latter relay, being of the slow-to-release type, remains operated during impulsing. Also the pulses are transmitted from the output stage of the F. M. radio receiver 240 through the receiving high pass filter 241 into the receiving amplifier 242 in order to cause the signal-in relay R245 to follow in an obvious manner. Each time the signal-in relay R245 operates and then restores, it interrupts and then recompletes, at the contacts 246, the previously traced circuit for energizing the lower winding of the signal-in relay R180 in the trunk circuit 100TC; whereby the latter relay follows. Each time the signal-in relay R180 restores and then reoperates, it completes and then interrupts, at the contacts 181, the previously traced circuit for energizing the upper winding of the sleeve relay R160 in multiple with the lower winding thereof and, consequently, in series with the winding of the supervisory relay R130 in the cord circuit 101; whereby the supervisory relay R130, being of the marginal type, follows. Each time the supervisory relay R130 operates and then restores, it completes and then interrupts, at the contacts 131, the previously mentioned circuit for illuminating the supervisory lamp L111; whereby the latter lamp is flashed rendering to the operator at the switchboard 100 recall supervision from the calling subscriber substation T in the automatic exchange 20.

Referring now more particularly to Fig. 7, the radiotelephone system there illustrated comprises a manual exchange 30 serving a group of subscriber substations, not shown, and a manual exchange 40 serving a group of subscriber substations, not shown, as well as two radio stations 225W and 325E. The manual exchange 30 comprises apparatus which is identical in every respect to the apparatus incorporated in the manual exchange 10 illustrated in Fig. 6 and identical reference characters have been employed to identify the same pieces of apparatus. The manual exchange 40 comprises an operator switchboard 100X identical in every respect to the operator switchboard 100 in the manual exchange 10 illustrated in Fig. 6; and a trunk circuit 100TCX identical in every respect to the corresponding trunk circuit 100TC in the manual exchange 10 illustrated in Fig. 6. Also the manual exchange 40 comprises a coupling circuit 300 identical in every respect to the coupling circuit 300 disposed in the automatic exchange 20 illustrated in Fig. 6 and connected to the trunk circuit 100TCX. Finally, in the radiotelephone system of Fig. 7, the radio stations 225W and 325E are identical in every respect to the corresponding radio stations 225W and 325E illustrated in the radiotelephone system of Fig. 6, and identical reference characters have been employed to identify the same pieces of apparatus.

It will be understood that the extension of a connection from a calling subscriber substation in the manual exchange 30 via the operator switchboard 100 therein, and over the radio link to the operator switchboard 100X in the manual exchange 40, and thence to a called subscriber substation therein, is carried out in a manner identical to the extension of a connection in the opposite direction from a calling subscriber substation in the manual exchange 40 to a called subscriber substation in the manual exchange 30. Moreover the operator at the switchboard 100 in the manual exchange 30 answers a call from a calling subscriber substation therein in precisely the same manner that the operator at the switchboard 100 in the manual exchange 10 answers a call from a calling subscriber substation therein. The operator at the switchboard 100 in the manual exchange 30 then seizes the trunk circuit 100TC to effect seizure of the apparatus in the radio station 225W and the consequent seizure of the apparatus in the radio station 325E and the ultimate seizure of the trunk circuit 100TCX in the manual exchange 40, precisely in the same manner that the operator at the switchboard 100 in the manual exchange 10 seizes the trunk circuit 100TC to effect seizure of the apparatus in the radio station 225W and the consequent seizure of the apparatus in the radio station 325E and the ultimate seizure of the trunk circuit 400TC in the automatic exchange 20. The operator at the switchboard 100X in the manual exchange 40 answers the call on the trunk circuit 100TCX and then completes the connection to the called subscriber substation therein, in precisely the same manner as the operator at the switchboard 100 in the manual exchange 10 answers a call on the trunk circuit 100TC and completes the connection to the called subscriber substation therein. The release of the established connection between the calling subscriber substation in the manual exchange 30 and the called subscriber substation in the manual exchange 40 is brought about by the operators at the switchboards 100 and 100X respectively therein, and precisely in the manner explained in conjunction with the release of an established connection by the operator at the switchboard 100 in the manual exchange 10.

In passing, it is noted that in the radiotelephone system illustrated in Fig. 7, it is well to modify the cord circuits disposed at the operator switchboard 100 in the manual exchange 30 and at the operator switchboard 100X in the manual exchange 40 in a minor particular, by eliminating the dials and dial keys therein since the arrangement including the dials and dial keys in the cord circuits mentioned, and illustrated in the cord circuit 101 disposed in the manual exchange 10 of Fig. 1, has utility only when a connection is to be extended from the operator switchboard 100 in the manual exchange 10 to a called subscriber substation in the automatic exchange 20.

Referring now more particularly to Fig. 8, the radiotelephone system there illustrated comprises an automatic exchange 50 serving a group of subscriber substations, including the subscriber substation T, and an automatic exchange 60 serving a group of subscriber substations, including the subscriber substation TX. The automatic exchange 50 comprises apparatus which is identical in every respect to the apparatus incorporated in the automatic exchange 20 illustrated in Fig. 6 and identical reference characters have been employed to identify the same pieces of apparatus. The automatic exchange 60 comprises automatic switching apparatus 500X identical in every respect to the automatic switching apparatus 500 illustrated in Fig. 6; and a trunk circuit 400TCX identical in every respect to the corresponding trunk circuit 400TC in the automatic exchange 20 illustrated in Fig. 6. Also the automatic exchange 60 comprises a coupling circuit 200 identical in every respect to the coupling circuit 200 disposed in the manual exchange 10 illustrated in Fig. 6 and connected to the trunk circuit 400TCX. Finally, in the radiotelephone system of Fig. 8, the radio stations 225W and 325E are identical in every respect to the corresponding radio stations 225W and 325E illustrated in the radiotelephone system of Fig. 6 and identical reference characters have been employed to identify the same pieces of apparatus.

It will be understood that the extension of a connection from a calling subscriber substation in the automatic exchange 50 via the automatic switching apparatus 500 therein and over the radio link to the automatic switching apparatus 500X in the automatic exchange 60 and thence to a called subscriber substation therein, is carried out in a manner identical to the extension of a connection in the opposite direction from a calling subscriber substation in the automatic exchange 60 to a called subscriber substation in the automatic exchange 50. Moreover, a subscriber at a calling subscriber substation, such, for example, as the subscriber substation T in the automatic exchange 50, initiates a call and is connected to the automatic switching apparatus 500 therein, in precisely the same manner that the subscriber at the calling subscriber substantion T in the automatic exchange 20 initiates a call and is connected to the automatic switching apparatus 500 therein. The subscriber at the calling subscriber substation T in the automatic exchange 50 then dials two digits into the automatic switching apparatus 500 therein in order to cause the automatic switching apparatus 500 therein to select the trunk circuit 400TC therein and, consequently, the radio link and the trunk circuit 400TCX in the automatic exchange 60, in precisely the same manner that the subscriber at the calling subscriber substation T in the automatic exchange 20 dials two digits into the automatic switching apparatus 500 therein, in order to cause the automatic switching apparatus 500 therein to select the trunk circuit 400TC therein and, consequently, the radio link and the trunk circuit 100TC in the manual exchange 10. When the trunk circuit 400TCX in the automatic exchange 60 is thus seized it is connected to the automatic switching apparatus 500X in precisely the same manner that the trunk 400TC in the automatic exchange 20 is connected to the automatic switching apparatus 500 in response to seizure thereof. At this time the subscriber at the calling subscriber substation T in the automatic exchange 50 dials three digits corresponding to the directory number of the called subscriber substation in the automatic exchange 60, such, for example, as the subscriber substation TX, thereby to cause the automatic switching apparatus 500X therein to select the subscriber line 530X extending to the called subscriber substation TX in the automatic exchange 60; which operations are brought about in precisely the same manner as the automatic switching apparatus 500 in the automatic exchange 20 operates to seize the subscriber line 530 extending to the called subscriber substation T therein under control of the operator at the switchboard 100 in the manual exchange 10. Accordingly, at this time there is completed a connection between the calling subscriber substation T in the automatic exchange 50 and the called subscriber substation TX in the automatic exchange 60. The release of the established connection between the calling subscriber substation T in the automatic exchange 50 and the called subscriber substation TX in the automatic exchange 60 is brought about by the subscribers at the substations mentioned therein and precisely in the same manner explained in conjunction with the release of the established connection between the subscriber substation T in the automatic exchange 20 and the operator switchboard 100 in the manual exchange 10.

In passing, it is noted that in the radiotelephone system illustrated in Fig. 8 it is well to modify the automatic switching apparatus 500 disposed in the automatic exchange 50 and the automatic switching apparatus 500X disposed in the automatic exchange 60 in a minor particular, by eliminating the class tone conductors in the finders of the finder-selector links incorporated therein, since the arrangement including the class tone conductors C546, etc. and illustrated in the automatic switching apparatus 500 disposed in the automatic exchange 20 of Fig. 5 has utility only when a connection is to be extended from a calling subscriber substation in the automatic exchange 20 to the operator switchboard 100 in the manual exchange 10.

In view of the foregoing, it is apparent that there have been provided radiotelephone systems involving automatic exchanges; wherein connections may be extended from calling subscriber substations by way of the associated automatic switching apparatus over the radio links, and connections may also be extended over the radio links and via the automatic switching apparatus to called subscriber substations. Also the radio links comprise facilities permitting duplex control and supervision.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. In a signalling system including first and second stations, first and second lines, first and second signal-in conductors, first and second signal-out conductors, means for connecting said first station to said first line, means responsive to the connection of said first station to said first line for applying a hold potential to said first signal-out conductor, means for connecting said second station to said second line, means responsive to the connection of said second station to said second line for applying a hold potential to said second signal-out conductor, and first and second transmitter-receiver pairs; said first transmitter being arranged to transmit a first radio frequency carrier and comprising a modulating circuit, an audio frequency coupling between said first line and said modulating circuit, a generator of an intermediate frequency, and means responsive to the presence of said hold potential on said first signal-out conductor for coupling said generator to said modulating circuit; said first receiver being arranged to receive said first radio frequency carrier and comprising an output circuit, an audio frequency coupling between said output circuit and said second line, and means including a signal circuit coupled to said output circuit and responsive to said intermediate frequency for applying a signal to said second signal-in conductor; said second transmitter being arranged to transmit a second radio frequency carrier and comprising a modulating circuit, an audio frequency coupling between said second line and said modulating circuit, a generator of an intermediate frequency, and means responsive to the presence of said hold potential on said second signal-out conductor for coupling said generator to said modulating circuit; said second receiver being arranged to receive said second radio frequency carrier and comprising an output circuit, an audio frequency coupling between said output circuit and said first line, and means including a signal circuit coupled to said output circuit and responsive to said intermediate frequency for applying a signal to said first signal-in conductor.

2. In a signalling system including first and second stations, first and second lines, first and second signal-in conductors, first and second signal-out conductors, means for connecting said first station to said first line, means responsive to the connection of said first station to said first line for applying a hold potential to said first signal-out conductor, means for connecting said second station to said second line, means responsive to the connection of said second station to said second line for applying a hold potential to said second signal-out conductor, and first and second transmitter-receiver pairs; said first transmitter being arranged to transmit a first radio frequency carrier and comprising a modulating circuit, an audio frequency coupling between said first line and said modulating circuit, a generator of an intermediate frequency, and means responsive to the presence of said hold potential on said first signal-out conductor for coupling said generator to said modulating circuit; said first receiver being arranged to receive said first radio frequency carrier and comprising a detector stage, an output stage, means coupling said detector stage and said output stage and responsive to said intermediate frequency for increasing the sensitivity of said output stage, an audio frequency coupling between said output stage and said second line, and means including a signal circuit coupled to said output stage and responsive to said intermediate frequency for applying a signal to said second signal-in conductor; said second transmitter being arranged to transmit a second radio frequency carrier and comprising a modulating circuit, an audio frequency coupling between said second line and said modulating circuit, a generator of an intermediate frequency, and means responsive to the presence of said hold potential on said second signal-out conductor for coupling said generator to said modulating circuit; said second receiver being arranged to receive said second radio frequency carrier and comprising a detector stage, an output stage, means coupling said detector stage and said output stage and responsive to said intermediate frequency for increasing the sensitivity of said output stage, an audio frequency coupling between said output stage and said first line, and means including a signal circuit coupled to said output stage and responsive to said intermediate frequency for applying a signal to said first signal-in conductor.

3. In a signalling system including first and second stations, first and second lines, first and second signal-in conductors, first and second signal-out conductors, means for connecting said first station to said first line, means responsive to the connection of said first station to said first line for applying a hold potential to said first signal-out conductor, means for connecting said second station to said second line, means responsive to the connection of said second station to said second line for applying a hold potential to said second signal-out conductor, and first and second transmitter-receiver pairs; said first and second transmitters being normally inoperative and said first and second receivers being normally operative; said first transmitter being arranged to transmit a first radio frequency carrier and comprising an operating circuit, a modulating circuit, an audio frequency coupling between said first line and said modulating circuit, a generator of an intermediate frequency, and means responsive to the presence of said hold potential on said first signal-out conductor for closing said operating circuit and for coupling said generator to said modulating circuit; said first receiver being arranged to receive said first radio frequency carrier and comprising an output circuit, an audio frequency coupling between said output circuit and said second line, and means including a signal circuit coupled to said output circuit and responsive to said intermediate frequency for applying a signal to said second signal-in conductor; said second transmitter being arranged to transmit a second radio frequency carrier and comprising an operating circuit, a modulating circuit, an audio frequency coupling between said second line and said modulating circuit, a generator of a second intermediate frequency, and means responsive to the presence of said hold potential on said second signal-out conductor for closing said operating circuit and for coupling said generator to said modulating circuit; said second receiver being arranged to receive said second radio frequency carrier and comprising an output circuit, an audio frequency coupling between said output circuit and said first line, and means including a signal circuit coupled to said output circuit and responsive to said intermediate frequency for applying a signal to said first signal-in conductor.

4. In a signalling system including first and second stations, first and second lines, first and second signal-in conductors, first and second signal-out conductors, means for connecting said first station to said first line, means responsive to the connection of said first station to said first line for applying a hold potential to said first signal-out conductor, means for connecting said second station to said second line, means responsive to the connection of said second station to said second line for applying a hold potential to said second signal-out conductor, and first and second transmitter-receiver pairs; said first and second transmitters being normally inoperative and said first and second receivers being normally operative; said first transmitter being arranged to transmit a first radio frequency carrier and comprising an operating circuit, a modulating circuit, an audio frequency coupling between said first line and said modulating circuit, a generator of an intermediate frequency, and means responsive to the presence of said hold potential on said first signal-out conductor for closing said operating circuit and for coupling said generator to said modulating circuit; said second transmitter being arranged to transmit a second radio frequency carrier and comprising an operating circuit, a modulating circuit, an audio frequency coupling between said second line and said modulating circuit, a generator of an intermediate frequency, and means responsive to the presence of said hold potential on said second signal-out conductor for closing said operating circuit and for coupling said generator to said modulating circuit; said first receiver being arranged to receive said first radio frequency carrier and comprising an output circuit, an audio frequency coupling between said output circuit and said second line, and means including a signal circuit coupled to said output circuit and responsive to said intermediate frequency for closing the operating circuit of said second transmitter and for applying a signal to said second signal-in conductor; said second receiver being arranged to receive said second radio frequency carrier and comprising an output circuit, an audio frequency coupling between said output circuit and said first line, and means including a signal circuit coupled to said output circuit and responsive to said intermediate frequency for closing the operating circuit of said first transmitter and for applying a signal to said first signal-in conductor.

5. In a signalling system, first and second stations, first and second trunks, means for connecting said first station to said first trunk, means for connecting said second station to said second trunk, first and second transmitter-receiver pairs, said first transmitter being arranged to transmit a first radio frequency carrier, said second transmitter being arranged to transmit a second radio frequency carrier, said first receiver being arranged to receive said first radio frequency carrier, said second receiver being arranged to receive said second radio frequency carrier, means responsive to the connection of said first station to said first trunk for modulating said first radio frequency carrier with a first intermediate frequency, means responsive to said first intermediate frequency component in said first receiver for signaling said second station, means responsive to the connection of said second station to said second trunk for modulating said second radio frequency carrier with a second intermediate frequency, means responsive to said second intermediate frequency component in said second receiver for signaling said first station, means responsive to an audio frequency signal originating on said first trunk for modulating said first radio frequency carrier therewith, means responsive to said audio frequency component in said first receiver for impressing a corresponding audio frequency signal upon said second trunk, means responsive to an audio frequency signal originating on said second trunk for modulating said second radio frequency carrier therewith, and means responsive to said audio frequency component in said second receiver for impressing a corresponding audio frequency signal upon said first trunk.

6. In a signalling system, first and second stations, first and second trunks, selective means for connecting said first station to said first trunk and for disconnecting it therefrom, selective means for connecting said second station to said second trunk and for disconnecting it therefrom, first and second transmitter-receiver pairs, said first transmitter being arranged to transmit a first radio frequency carrier, said second transmitter being arranged to transmit a second radio frequency carrier, said first receiver being arranged to receive said first radio frequency carrier, said second receiver being arranged to receive said second radio frequency carrier, means responsive to the connection of said first station to said trunk for initiating modulation of said first radio frequency carrier with a first intermediate frequency and responsive to the disconnection of said first station from said first trunk for arresting modulation of said first radio frequency carrier with said first intermediate frequency, means responsive to said first intermediate frequency component in said first receiver for applying a given signal to said second trunk, whereby disconnections of said first station from said first trunk bring about corresponding interruptions in said given signal applied to said second trunk, means responsive to the connection of said second station to said second trunk for initiating modulation of said second radio frequency carrier with a second intermediate frequency and responsive to the disconnection of said second station from said second trunk for arresting modulation of said second radio frequency carrier with said second intermediate frequency, means responsive to said second intermediate frequency component in said second receiver for applying a given signal to said first trunk, whereby disconnections of said second station from said second trunk bring about corresponding interruptions in said given signal applied to said first trunk, means responsive to an audio frequency signal originating on said first trunk for modulating said first radio frequency carrier therewith, means responsive to said audio frequency component in said first receiver for impressing a corresponding audio frequency signal upon said second trunk, means responsive to an audio frequency signal originating on said second trunk for modulating said second radio frequency carrier therewith, and means responsive to said audio frequency component in said second receiver for impressing a corresponding audio frequency signal upon said first trunk.

7. In a signalling system including first and second stations, first and second signals respectively at said first and second stations, first and second transmitter-receiver pairs, first and second lines, first and second signal-in conductors, and first and second signal-out conductors; means controllable from said first station for connecting said first station to said first line, means responsive to the connection of said first station to said first line for applying a holding potential to said first signal-out conductor; means responsive to the presence of a signal potential on said first signal-in conductor for operating said first signal; means controllable from said second station for connecting said second station to said second line, means responsive to the connection of said second station to said second line for applying a holding potential to said second signal-out conductor; means responsive to the presence of a signal potential on said second signal-in conductor for operating said second signal; said first transmitter being arranged to transmit a first radio frequency carrier and comprising a modulating circuit, an audio frequency coupling between said first line and said modulating circuit, a generator of a first intermediate frequency, and means responsive to the presence of said holding potential on said first signal-out conductor for coupling said generator to said modulating circuit; said first receiver being arranged to receive said first radio frequency carrier and comprising an output circuit, an audio frequency coupling between said output circuit and said second line, and means including a signal circuit coupled to said output circuit and responsive to said first intermediate frequency for applying said signal potential to said second signal-in conductor; said second transmitter being arranged to transmit a second radio frequency carrier and comprising a modulating circuit, an audio frequency coupling between said second line and said modulating circuit, a generator of a second intermediate frequency, and means responsive to the presence of said holding potential on said signal-out conductor for coupling said generator to said modulating circuit; said second receiver being arranged to receive said second radio frequency carrier and comprising an output circuit, an audio frequency coupling between said output circuit and said first line, and means including a signal circuit coupled to said output circuit and responsive to said second intermediate frequency for applying said signal potential to said first signal-in conductor.

8. A radiotelephone system including a first station, first and second transmitter-receiver pairs, a signal at said first station, a first line and a first signal-in conductor and a first signal-out conductor extending to said first station, means controllable from said first station for connecting said first station to said first line, means responsive to the connection of said first station to said first line for applying a holding potential to said first signal-out conductor, additional means controllable from said first station for interrupting the application of said holding potential to said first signal-out conductor in accordance with digits, means responsive to the presence of a signal potential on said first signal-in conductor for operating said signal, a second station, automatic switching apparatus having access to said second station, a second line and a second signal-in conductor and a second signal-out conductor extending to said switching apparatus, means responsive to the presence of a signal potential on said second signal-in conductor for seizing said switching apparatus and responsive to the interruption of said signal potential on said second signal-in conductor in accordance with digits for correspondingly operating said switching apparatus to extend the call to said second station, means responsive to answering of the call at said second station for connecting said second station to said second line and for applying a holding potential to said second signal-out conductor; said first transmitter being arranged to transmit a first radio frequency carrier and comprising a modulating circuit, an audio frequency coupling between said first line and said modulating circuit, a generator of a first intermediate frequency, and means responsive to the presence of said holding potential on said first signal-out conductor for coupling said generator to said modulating circuit; said first receiver being arranged to receive said first radio frequency carrier and comprising an output circuit, an audio frequency coupling between said output circuit and said second line, and means including a signal circuit coupled to said output circuit and responsive to said first intermediate frequency for applying said signal potential to said second signal-in conductor; said second transmitter being arranged to transmit a second radio frequency carrier and comprising a modulating circuit, an audio frequency coupling between said second line and said modulating circuit, a generator of a second intermediate frequency, and means responsive to the presence of said holding potential on said second signal-out conductor for coupling said generator to said modulating circuit; said second receiver being arranged to receive said second radio frequency carrier and comprising an output circuit, an audio frequency coupling between said output circuit and said first line, and means including a signal circuit coupled to said output circuit and responsive to said second intermediate frequency for applying said signal potential to said first signal-in conductor.

IMRE MOLNAR.

(References on following page)

REFERENCES CITED

The following references are of record in the file of this patent:

UNITED STATES PATENTS

| Number | Name | Date |
|---|---|---|
| 1,572,756 | Smythe et al. | Feb. 9, 1926 |
| 1,688,453 | Demarest et al. | Oct. 23, 1928 |
| 2,061,699 | Fox | Nov. 24, 1936 |
| 2,064,894 | Espenschied | Dec. 22, 1936 |
| 2,064,905 | Green | Dec. 22, 1936 |
| 2,064,958 | Taylor | Dec. 22, 1936 |
| 2,129,332 | Mastini | Sept. 6, 1938 |
| 2,183,389 | Bjornson | Dec. 12, 1939 |
| 2,248,746 | Davis | July 8, 1941 |
| 2,314,707 | Katzin | Mar. 23, 1943 |
| 2,349,870 | Koch | May 30, 1944 |
| 2,383,908 | Bowers | Aug. 28, 1945 |
| 2,425,614 | Goddard | Aug. 12, 1947 |
| 2,454,498 | Bartelink | Nov. 23, 1948 |

Certificate of Correction

Patent No. 2,523,914

September 26, 1950

IMRE MOLNAR

It is hereby certified that error appears in the printed specification of the above numbered patent requiring correction as follows:

Column 45, line 69, after the words "on said" insert *second*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*